US012058583B2

(12) United States Patent
Brody et al.

(10) Patent No.: US 12,058,583 B2
(45) Date of Patent: *Aug. 6, 2024

(54) SELECTIVE LOCATION-BASED IDENTITY COMMUNICATION

(71) Applicant: Snap Inc., Santa Monica, CA (US)

(72) Inventors: Jonathan Brody, Marina Del Rey, CA (US); Walton Lin, Chatham, NJ (US); Andrew Lin, Long Island City, NY (US); Evan Spiegel, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,896

(22) Filed: Aug. 10, 2022

(65) Prior Publication Data

US 2023/0033214 A1 Feb. 2, 2023

Related U.S. Application Data

(63) Continuation of application No. 17/248,841, filed on Feb. 10, 2021, now Pat. No. 11,418,906, which is a
(Continued)

(51) Int. Cl.
*H04W 4/02* (2018.01)
*G06Q 50/00* (2012.01)
*H04W 68/00* (2009.01)

(52) U.S. Cl.
CPC .............. *H04W 4/02* (2013.01); *G06Q 50/01* (2013.01); *H04W 68/005* (2013.01)

(58) Field of Classification Search
CPC ......... H04W 4/02; H04W 4/021; H04W 4/18; H04W 64/00; H04L 67/18; G06Q 50/01; H04M 1/72572; H04M 2250/10
See application file for complete search history.

(56) References Cited

U.S. PATENT DOCUMENTS 666,223 A 1/1901 Shedlock
4,581,634 A 4/1986 Williams
(Continued)

FOREIGN PATENT DOCUMENTS

CA 2887596 A1 7/2015
CN 101127109 A 2/2008
(Continued)

OTHER PUBLICATIONS

"A Whole New Story", Snap, Inc., [Online] Retrieved from the Internet: <URL: https://www.snap.com/en-US/news/>, (2017), 13 pgs.
(Continued)

*Primary Examiner* — Liton Miah
(74) *Attorney, Agent, or Firm* — Schwegman Lundberg & Woessner, P.A.

(57) ABSTRACT

Systems, devices, media, and methods are presented for selective location-based identity communication. The systems and methods identify a current location of a mobile computing device and detect a selection of a user interface element associated with the current location. The systems and methods cause presentation of a set of display elements corresponding to the current location and detect selection of a display element of the set of display elements. The systems and methods modify a display characteristic for the current location of the mobile computing device within a set of mobile computing devices based on the selection of the display element.

14 Claims, 11 Drawing Sheets

Related U.S. Application Data continuation of application No. 16/245,660, filed on Jan. 11, 2019, now Pat. No. 10,952,013, which is a continuation of application No. 15/859,101, filed on Dec. 29, 2017, now Pat. No. 10,212,541.

(60) Provisional application No. 62/554,937, filed on Sep. 6, 2017, provisional application No. 62/491,115, filed on Apr. 27, 2017.

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,559,707 A | 9/1996 | Delorme et al. |
| 5,713,073 A | 1/1998 | Warsta |
| 5,754,939 A | 5/1998 | Herz et al. |
| 5,826,269 A | 10/1998 | Hussey |
| 5,855,008 A | 12/1998 | Goldhaber et al. |
| 5,880,731 A | 3/1999 | Liles et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,023,270 A | 2/2000 | Brush, II et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,158,044 A | 12/2000 | Tibbetts |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,223,165 B1 | 4/2001 | Lauffer |
| 6,233,318 B1 | 5/2001 | Picard et al. |
| 6,283,858 B1 | 9/2001 | Hayes, Jr. et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,374,292 B1 | 4/2002 | Srivastava et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,473,794 B1 | 10/2002 | Guheen et al. |
| 6,484,196 B1 | 11/2002 | Maurille |
| 6,487,586 B2 | 11/2002 | Ogilvie et al. |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,701,347 B1 | 3/2004 | Ogilvie |
| 6,711,608 B1 | 3/2004 | Ogilvie |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,772,195 B1 | 8/2004 | Hatlelid et al. |
| 6,832,222 B1 | 12/2004 | Zimowski |
| 6,834,195 B2 | 12/2004 | Brandenberg et al. |
| 6,836,792 B1 | 12/2004 | Chen |
| 6,839,411 B1 | 1/2005 | Saltanov et al. |
| 6,842,779 B1 | 1/2005 | Nishizawa |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,073,129 B1 | 7/2006 | Robarts et al. |
| 7,079,158 B2 | 7/2006 | Lambertsen |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,243,163 B1 | 7/2007 | Friend et al. |
| 7,269,426 B2 | 9/2007 | Kokkonen et al. |
| 7,278,168 B1 | 10/2007 | Chaudhury et al. |
| 7,280,123 B2 | 10/2007 | Bentley et al. |
| 7,280,658 B2 | 10/2007 | Amini et al. |
| 7,315,823 B2 | 1/2008 | Brondrup |
| 7,342,587 B2 | 3/2008 | Danzig et al. |
| 7,349,768 B2 | 3/2008 | Bruce et al. |
| 7,356,564 B2 | 4/2008 | Hartselle et al. |
| 7,376,715 B2 | 5/2008 | Cunningham et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,468,729 B1 | 12/2008 | Levinson |
| 7,478,402 B2 | 1/2009 | Christensen et al. |
| 7,496,347 B2 | 2/2009 | Puranik |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,469 B2 | 5/2009 | Kim et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,627,828 B1 | 12/2009 | Collison et al. |
| 7,636,755 B2 | 12/2009 | Blattner et al. |
| 7,639,251 B2 | 12/2009 | Gu et al. |
| 7,639,943 B1 | 12/2009 | Kalajan |
| 7,650,231 B2 | 1/2010 | Gadler |
| 7,668,537 B2 | 2/2010 | DeVries |
| 7,689,649 B2 | 3/2010 | Heikes et al. |
| 7,703,140 B2 | 4/2010 | Nath et al. |
| 7,752,251 B1 | 7/2010 | Shuster et al. |
| 7,770,137 B2 | 8/2010 | Forbes et al. |
| 7,775,885 B2 | 8/2010 | Van Luchene et al. |
| 7,778,973 B2 | 8/2010 | Choi |
| 7,779,444 B2 | 8/2010 | Glad |
| 7,787,886 B2 | 8/2010 | Markhovsky et al. |
| 7,792,789 B2 | 9/2010 | Prahlad et al. |
| 7,796,946 B2 | 9/2010 | Eisenbach |
| 7,801,954 B2 | 9/2010 | Cadiz et al. |
| 7,818,336 B1 | 10/2010 | Amidon et al. |
| 7,856,360 B2 | 12/2010 | Kramer et al. |
| 7,859,551 B2 | 12/2010 | Bulman et al. |
| 7,885,931 B2 | 2/2011 | Seo et al. |
| 7,912,896 B2 | 3/2011 | Wolovitz et al. |
| 7,925,703 B2 | 4/2011 | Dinan et al. |
| 8,001,204 B2 | 8/2011 | Burtner et al. |
| 8,032,586 B2 | 10/2011 | Challenger et al. |
| 8,077,931 B1 | 12/2011 | Chatman et al. |
| 8,082,255 B1 | 12/2011 | Carlson, Jr. et al. |
| 8,088,044 B2 | 1/2012 | Tchao et al. |

(56) References Cited

U.S. PATENT DOCUMENTS

| | | |
|---|---|---|
| 8,090,351 B2 | 1/2012 | Klein |
| 8,095,878 B2 | 1/2012 | Bates et al. |
| 8,098,904 B2 | 1/2012 | Ioffe et al. |
| 8,099,109 B2 | 1/2012 | Altman et al. |
| 8,108,774 B2 | 1/2012 | Finn et al. |
| 8,112,716 B2 | 2/2012 | Kobayashi |
| 8,117,281 B2 | 2/2012 | Robinson et al. |
| 8,130,219 B2 | 3/2012 | Fleury et al. |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,146,005 B2 | 3/2012 | Jones et al. |
| 8,151,191 B2 | 4/2012 | Nicol |
| 8,161,115 B2 | 4/2012 | Yamamoto |
| 8,161,417 B1 | 4/2012 | Lee |
| 8,169,505 B2 | 5/2012 | Hoshi |
| 8,170,957 B2 | 5/2012 | Richard |
| 8,195,203 B1 | 6/2012 | Tseng |
| 8,195,748 B2 | 6/2012 | Hallyn |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,238,947 B2 | 8/2012 | Lottin et al. |
| 8,244,593 B2 | 8/2012 | Klinger et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,384,719 B2 | 2/2013 | Reville et al. |
| 8,385,950 B1 | 2/2013 | Wagner et al. |
| RE44,054 E | 3/2013 | Kim |
| 8,396,708 B2 | 3/2013 | Park et al. |
| 8,402,097 B2 | 3/2013 | Szeto |
| 8,405,773 B2 | 3/2013 | Hayashi et al. |
| 8,413,059 B2 | 4/2013 | Lee et al. |
| 8,418,067 B2 | 4/2013 | Cheng et al. |
| 8,423,409 B2 | 4/2013 | Rao |
| 8,425,322 B2 | 4/2013 | Gillo et al. |
| 8,457,367 B1 | 6/2013 | Sipe et al. |
| 8,458,601 B2 | 6/2013 | Castelli et al. |
| 8,462,198 B2 | 6/2013 | Lin et al. |
| 8,471,914 B2 | 6/2013 | Sakiyama et al. |
| 8,472,935 B1 | 6/2013 | Fujisaki |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,559,980 B2 | 10/2013 | Pujol |
| 8,560,612 B2 | 10/2013 | Kilmer et al. |
| 8,564,621 B2 | 10/2013 | Branson et al. |
| 8,564,710 B2 | 10/2013 | Nonaka et al. |
| 8,570,326 B2 | 10/2013 | Gorev |
| 8,570,907 B2 | 10/2013 | Garcia, Jr. et al. |
| 8,581,911 B2 | 11/2013 | Becker et al. |
| 8,594,680 B2 | 11/2013 | Ledlie et al. |
| 8,597,121 B2 | 12/2013 | del Valle |
| 8,601,051 B2 | 12/2013 | Wang |
| 8,601,379 B2 | 12/2013 | Marks et al. |
| 8,613,089 B1 | 12/2013 | Holloway et al. |
| 8,632,408 B2 | 1/2014 | Gillo et al. |
| 8,639,767 B1 | 1/2014 | Harris et al. |
| 8,648,865 B2 | 2/2014 | Dawson et al. |
| 8,655,389 B1 | 2/2014 | Jackson et al. |
| 8,659,548 B2 | 2/2014 | Hildreth |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,683,354 B2 | 3/2014 | Khandelwal et al. |
| 8,692,830 B2 | 4/2014 | Nelson et al. |
| 8,700,012 B2 | 4/2014 | Ferren et al. |
| 8,718,333 B2 | 5/2014 | Wolf et al. |
| 8,724,622 B2 | 5/2014 | Rojas |
| 8,730,231 B2 | 5/2014 | Snoddy et al. |
| 8,732,168 B2 | 5/2014 | Johnson |
| 8,738,719 B2 | 5/2014 | Lee et al. |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,887,035 B2 | 11/2014 | Mcdonald et al. |
| 8,890,926 B2 | 11/2014 | Tandon et al. |
| 8,892,999 B2 | 11/2014 | Nims et al. |
| 8,893,010 B1 | 11/2014 | Brin et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,924,250 B2 | 12/2014 | Bates et al. |
| 8,935,656 B2 | 1/2015 | Dandia et al. |
| 8,963,926 B2 | 2/2015 | Brown et al. |
| 8,972,357 B2 | 3/2015 | Shim et al. |
| 8,989,786 B2 | 3/2015 | Feghali |
| 8,995,433 B2 | 3/2015 | Rojas |
| 9,002,643 B2 | 4/2015 | Xu |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,083,770 B1 | 7/2015 | Drose et al. |
| 9,086,776 B2 | 7/2015 | Ye et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,148,424 B1 | 9/2015 | Yang |
| 9,152,477 B1 | 10/2015 | Campbell et al. |
| 9,191,776 B2 | 11/2015 | Root et al. |
| 9,204,252 B2 | 12/2015 | Root |
| 9,224,220 B2 | 12/2015 | Toyoda et al. |
| 9,225,805 B2 | 12/2015 | Kujawa et al. |
| 9,225,897 B1 | 12/2015 | Sehn et al. |
| 9,237,202 B1 | 1/2016 | Sehn |
| 9,241,184 B2 | 1/2016 | Weerasinghe |
| 9,247,377 B2 | 1/2016 | Pai et al. |
| 9,256,860 B2 | 2/2016 | Herger et al. |
| 9,258,459 B2 | 2/2016 | Hartley |
| 9,264,463 B2 | 2/2016 | Rubinstein et al. |
| 9,276,886 B1 | 3/2016 | Samaranayake |
| 9,294,425 B1 | 3/2016 | Son |
| 9,298,257 B2 | 3/2016 | Hwang et al. |

(56) References Cited

U.S. PATENT DOCUMENTS

| | | |
|---|---|---|
| 9,314,692 B2 | 4/2016 | Konoplev et al. |
| 9,330,483 B2 | 5/2016 | Du et al. |
| 9,344,606 B2 | 5/2016 | Hartley et al. |
| 9,357,174 B2 | 5/2016 | Li et al. |
| 9,361,510 B2 | 6/2016 | Yao et al. |
| 9,369,422 B1 | 6/2016 | Ozog |
| 9,378,576 B2 | 6/2016 | Bouaziz et al. |
| 9,385,983 B1 | 7/2016 | Sehn |
| 9,392,308 B2 | 7/2016 | Ahmed et al. |
| 9,396,354 B1 | 7/2016 | Murphy et al. |
| 9,402,057 B2 | 7/2016 | Kaytaz et al. |
| 9,407,712 B1 | 8/2016 | Sehn |
| 9,407,816 B1 | 8/2016 | Sehn |
| 9,412,192 B2 | 8/2016 | Mandel et al. |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,460,541 B2 | 10/2016 | Li et al. |
| 9,482,882 B1 | 11/2016 | Hanover et al. |
| 9,482,883 B1 | 11/2016 | Meisenholder |
| 9,485,747 B1 | 11/2016 | Rodoper et al. |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,532,171 B2 | 12/2016 | Allen et al. |
| 9,537,811 B2 | 1/2017 | Allen et al. |
| 9,544,257 B2 | 1/2017 | Ogundokun et al. |
| 9,560,006 B2 | 1/2017 | Prado et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,628,950 B1 | 4/2017 | Noeth et al. |
| 9,635,195 B1 | 4/2017 | Green et al. |
| 9,641,870 B1 | 5/2017 | Cormie et al. |
| 9,648,376 B2 | 5/2017 | Chang et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,697,635 B2 | 7/2017 | Quinn et al. |
| 9,705,831 B2 | 7/2017 | Spiegel |
| 9,706,040 B2 | 7/2017 | Kadirvel et al. |
| 9,710,821 B2 | 7/2017 | Heath |
| 9,742,713 B2 | 8/2017 | Spiegel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,773,284 B2 | 9/2017 | Huang et al. |
| 9,785,796 B1 | 10/2017 | Murphy et al. |
| 9,792,714 B2 | 10/2017 | Li et al. |
| 9,824,463 B2 | 11/2017 | Ingrassia et al. |
| 9,825,898 B2 | 11/2017 | Sehn |
| 9,839,844 B2 | 12/2017 | Dunstan et al. |
| 9,854,219 B2 | 12/2017 | Sehn |
| 9,883,838 B2 | 2/2018 | Kaleal, III et al. |
| 9,894,476 B2 | 2/2018 | Fraccaroli |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,961,520 B2 | 5/2018 | Brooks et al. |
| 9,980,100 B1 | 5/2018 | Charlton et al. |
| 9,990,373 B2 | 6/2018 | Fortkort |
| 9,990,653 B1 | 6/2018 | Lewis et al. |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,146,748 B1 | 12/2018 | Barndollar et al. |
| 10,155,168 B2 | 12/2018 | Blackstock et al. |
| 10,158,589 B2 | 12/2018 | Collet et al. |
| 10,178,507 B1 | 1/2019 | Roberts |
| 10,194,270 B2 | 1/2019 | Yokoyama et al. |
| 10,212,541 B1 | 2/2019 | Brody et al. |
| 10,237,692 B2 | 3/2019 | Shan et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,375,519 B2 | 8/2019 | Pai et al. |
| 10,382,378 B2 | 8/2019 | Garcia et al. |
| 10,432,498 B1 | 10/2019 | Mcclendon |
| 10,475,225 B2 | 11/2019 | Park et al. |
| 10,496,661 B2 | 12/2019 | Morgan et al. |
| 10,504,266 B2 | 12/2019 | Blattner et al. |
| 10,573,048 B2 | 2/2020 | Ni et al. |
| 10,599,291 B2 | 3/2020 | Cheung et al. |
| 10,657,701 B2 | 5/2020 | Osman et al. |
| 10,938,758 B2 | 3/2021 | Allen et al. |
| 10,952,013 B1 | 3/2021 | Brody et al. |
| 10,963,529 B1 | 3/2021 | Amitay et al. |
| 11,385,763 B2 | 7/2022 | Amitay et al. |
| 11,392,264 B1 | 7/2022 | Amitay et al. |
| 11,409,407 B2 | 8/2022 | Amitay et al. |
| 11,418,906 B2 | 8/2022 | Brody et al. |
| 11,451,956 B1 | 9/2022 | Amitay et al. |
| 11,474,663 B2 | 10/2022 | Amitay et al. |
| 11,556,221 B2 | 1/2023 | Amitay et al. |
| 11,782,574 B2 | 10/2023 | Amitay et al. |
| 11,842,411 B2 | 12/2023 | Amitay et al. |
| 2002/0035607 A1 | 3/2002 | Checkoway et al. |
| 2002/0047868 A1 | 4/2002 | Miyazawa |
| 2002/0059193 A1 | 5/2002 | Decime et al. |
| 2002/0067362 A1 | 6/2002 | Agostino Nocera et al. |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2002/0169644 A1 | 11/2002 | Greene |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0206171 A1 | 11/2003 | Kim et al. |
| 2003/0217106 A1 | 11/2003 | Adar et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0144241 A1 | 6/2005 | Stata et al. |
| 2005/0162419 A1 | 7/2005 | Kim et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0206610 A1 | 9/2005 | Cordelli |

(56) References Cited

U.S. PATENT DOCUMENTS

| | | |
|---|---|---|
| 2005/0223066 A1 | 10/2005 | Buchheit et al. |
| 2005/0270299 A1 | 12/2005 | Rasmussen et al. |
| 2005/0280660 A1 | 12/2005 | Seo et al. |
| 2005/0288954 A1 | 12/2005 | McCarthy et al. |
| 2006/0026067 A1 | 2/2006 | Nicholas et al. |
| 2006/0031412 A1 | 2/2006 | Adams et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0145944 A1 | 7/2006 | Tarlton et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2006/0294465 A1 | 12/2006 | Ronen et al. |
| 2007/0004426 A1 | 1/2007 | Pfleging et al. |
| 2007/0011270 A1 | 1/2007 | Klein et al. |
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0113181 A1 | 5/2007 | Blattner et al. |
| 2007/0118520 A1 | 5/2007 | Bliss et al. |
| 2007/0136228 A1 | 6/2007 | Petersen |
| 2007/0168863 A1 | 7/2007 | Blattner et al. |
| 2007/0176921 A1 | 8/2007 | Iwasaki et al. |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0218987 A1 | 9/2007 | Luchene et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0258656 A1 | 11/2007 | Aarabi et al. |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0055269 A1 | 3/2008 | Lemay et al. |
| 2008/0062141 A1 | 3/2008 | Chandhri |
| 2008/0070593 A1 | 3/2008 | Altman et al. |
| 2008/0076505 A1 | 3/2008 | Ngyen et al. |
| 2008/0084429 A1 | 4/2008 | Wissinger |
| 2008/0092233 A1 | 4/2008 | Tian et al. |
| 2008/0094387 A1 | 4/2008 | Chen |
| 2008/0097979 A1 | 4/2008 | Heidloff et al. |
| 2008/0104503 A1 | 5/2008 | Beall et al. |
| 2008/0109159 A1 | 5/2008 | Shi et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158222 A1 | 7/2008 | Li et al. |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0201638 A1 | 8/2008 | Nair |
| 2008/0207176 A1 | 8/2008 | Brackbill et al. |
| 2008/0208692 A1 | 8/2008 | Garaventi et al. |
| 2008/0209329 A1 | 8/2008 | Defranco et al. |
| 2008/0214210 A1 | 9/2008 | Rasanen et al. |
| 2008/0216092 A1 | 9/2008 | Serlet |
| 2008/0222108 A1 | 9/2008 | Prahlad et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0309617 A1 | 12/2008 | Kong et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0013268 A1 | 1/2009 | Amit |
| 2009/0015703 A1 | 1/2009 | Kim et al. |
| 2009/0016617 A1 | 1/2009 | Bregman-Amitai et al. |
| 2009/0024956 A1 | 1/2009 | Kobayashi |
| 2009/0030774 A1 | 1/2009 | Rothschild et al. |
| 2009/0030884 A1 | 1/2009 | Pulfer et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0044113 A1 | 2/2009 | Jones et al. |
| 2009/0047972 A1 | 2/2009 | Neeraj |
| 2009/0055484 A1 | 2/2009 | Vuong et al. |
| 2009/0058822 A1 | 3/2009 | Chaudhri |
| 2009/0070688 A1 | 3/2009 | Gyorfi et al. |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0099925 A1 | 4/2009 | Mehta et al. |
| 2009/0100367 A1 | 4/2009 | Dargahi et al. |
| 2009/0106672 A1 | 4/2009 | Burstrom |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0134968 A1 | 5/2009 | Girgensohn et al. |
| 2009/0144639 A1 | 6/2009 | Nims et al. |
| 2009/0148045 A1 | 6/2009 | Lee et al. |
| 2009/0150778 A1 | 6/2009 | Nicol |
| 2009/0153492 A1 | 6/2009 | Popp |
| 2009/0153552 A1 | 6/2009 | Fidaleo et al. |
| 2009/0157450 A1 | 6/2009 | Athsani et al. |
| 2009/0157752 A1 | 6/2009 | Gonzalez |
| 2009/0158170 A1 | 6/2009 | Narayanan et al. |
| 2009/0160970 A1 | 6/2009 | Fredlund et al. |
| 2009/0163182 A1 | 6/2009 | Gatti et al. |
| 2009/0164459 A1 | 6/2009 | Jennings et al. |
| 2009/0177299 A1 | 7/2009 | Van De Sluis |
| 2009/0177976 A1 | 7/2009 | Bokor et al. |
| 2009/0192900 A1 | 7/2009 | Collision |
| 2009/0199242 A1 | 8/2009 | Johnson et al. |
| 2009/0202114 A1 | 8/2009 | Morin et al. |
| 2009/0215469 A1 | 8/2009 | Fisher et al. |
| 2009/0228811 A1 | 9/2009 | Adams et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0254840 A1 | 10/2009 | Churchill et al. |
| 2009/0265604 A1 | 10/2009 | Howard et al. |
| 2009/0265647 A1 | 10/2009 | Martin et al. |
| 2009/0284551 A1 | 11/2009 | Stanton |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0300525 A1 | 12/2009 | Jolliff et al. |
| 2009/0303984 A1 | 12/2009 | Clark et al. |
| 2009/0319178 A1 | 12/2009 | Khosravy et al. |
| 2009/0319607 A1 | 12/2009 | Belz et al. |
| 2009/0327073 A1 | 12/2009 | Li |
| 2009/0328122 A1 | 12/2009 | Amento et al. |
| 2010/0011422 A1 | 1/2010 | Mason et al. |

(56) References Cited

U.S. PATENT DOCUMENTS

| | | |
|---|---|---|
| 2010/0023885 A1 | 1/2010 | Reville et al. |
| 2010/0058212 A1 | 3/2010 | Belitz et al. |
| 2010/0062794 A1 | 3/2010 | Han |
| 2010/0073487 A1 | 3/2010 | Sogoh et al. |
| 2010/0082427 A1 | 4/2010 | Burgener et al. |
| 2010/0082693 A1 | 4/2010 | Hugg et al. |
| 2010/0083140 A1 | 4/2010 | Dawson et al. |
| 2010/0083148 A1 | 4/2010 | Finn et al. |
| 2010/0100568 A1 | 4/2010 | Papin et al. |
| 2010/0100828 A1 | 4/2010 | Khandelwal et al. |
| 2010/0113065 A1 | 5/2010 | Narayan et al. |
| 2010/0115407 A1 | 5/2010 | Kim et al. |
| 2010/0115426 A1 | 5/2010 | Liu et al. |
| 2010/0121915 A1 | 5/2010 | Wang |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0179953 A1 | 7/2010 | Kan et al. |
| 2010/0179991 A1 | 7/2010 | Lorch et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0203968 A1 | 8/2010 | Gill et al. |
| 2010/0205242 A1 | 8/2010 | Marchioro, II et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0227682 A1 | 9/2010 | Reville et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0262915 A1 | 10/2010 | Bocking et al. |
| 2010/0273509 A1 | 10/2010 | Sweeney et al. |
| 2010/0274724 A1 | 10/2010 | Bible, Jr. et al. |
| 2010/0279713 A1 | 11/2010 | Dicke |
| 2010/0281045 A1 | 11/2010 | Dean |
| 2010/0290756 A1 | 11/2010 | Karaoguz et al. |
| 2010/0299060 A1 | 11/2010 | Snavely et al. |
| 2010/0306669 A1 | 12/2010 | Della Pasqua |
| 2010/0332980 A1 | 12/2010 | Sun et al. |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0047404 A1 | 2/2011 | Metzler et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066664 A1 | 3/2011 | Goldman et al. |
| 2011/0066743 A1 | 3/2011 | Hurley et al. |
| 2011/0083101 A1 | 4/2011 | Sharon et al. |
| 2011/0093780 A1 | 4/2011 | Dunn |
| 2011/0099507 A1 | 4/2011 | Nesladek et al. |
| 2011/0102630 A1 | 5/2011 | Rukes |
| 2011/0115798 A1 | 5/2011 | Nayar et al. |
| 2011/0119133 A1 | 5/2011 | Igelman et al. |
| 2011/0126096 A1 | 5/2011 | Ohashi et al. |
| 2011/0137881 A1 | 6/2011 | Cheng et al. |
| 2011/0145564 A1 | 6/2011 | Moshir et al. |
| 2011/0148864 A1 | 6/2011 | Lee et al. |
| 2011/0153759 A1 | 6/2011 | Rathod |
| 2011/0159890 A1 | 6/2011 | Fortescue et al. |
| 2011/0161076 A1 | 6/2011 | Davis et al. |
| 2011/0164163 A1 | 7/2011 | Bilbrey et al. |
| 2011/0167125 A1 | 7/2011 | Achlioptas |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0211764 A1 | 9/2011 | Krupka et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238762 A1 | 9/2011 | Soni et al. |
| 2011/0238763 A1 | 9/2011 | Shin et al. |
| 2011/0239136 A1 | 9/2011 | Goldman et al. |
| 2011/0239143 A1 | 9/2011 | Ye et al. |
| 2011/0246330 A1 | 10/2011 | Tikku et al. |
| 2011/0249891 A1 | 10/2011 | Li |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0285703 A1 | 11/2011 | Jin |
| 2011/0286586 A1 | 11/2011 | Saylor et al. |
| 2011/0292051 A1 | 12/2011 | Nelson et al. |
| 2011/0300837 A1 | 12/2011 | Misiag |
| 2011/0314419 A1 | 12/2011 | Dunn et al. |
| 2011/0320373 A1 | 12/2011 | Lee et al. |
| 2012/0013770 A1 | 1/2012 | Stafford et al. |
| 2012/0015673 A1 | 1/2012 | Klassen et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0059826 A1 | 3/2012 | Mate et al. |
| 2012/0062805 A1 | 3/2012 | Candelore |
| 2012/0069028 A1 | 3/2012 | Bouguerra |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113106 A1 | 5/2012 | Choi et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0130717 A1 | 5/2012 | Xu et al. |
| 2012/0131507 A1 | 5/2012 | Sparandara et al. |
| 2012/0131512 A1 | 5/2012 | Takeuchi et al. |
| 2012/0139830 A1 | 6/2012 | Hwang et al. |
| 2012/0141046 A1 | 6/2012 | Chen et al. |
| 2012/0143760 A1 | 6/2012 | Abulafia et al. |
| 2012/0144452 A1 | 6/2012 | Dyor et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0188247 A1 | 7/2012 | Cheung et al. |
| 2012/0197724 A1 | 8/2012 | Kendall |
| 2012/0200743 A1 | 8/2012 | Blanchflower et al. |
| 2012/0209921 A1 | 8/2012 | Adafin et al. |
| 2012/0209924 A1 | 8/2012 | Evans et al. |
| 2012/0210244 A1 | 8/2012 | De Francisco et al. |
| 2012/0212632 A1 | 8/2012 | Mate et al. |

(56) References Cited

U.S. PATENT DOCUMENTS

| | | |
|---|---|---|
| 2012/0220264 A1 | 8/2012 | Kawabata |
| 2012/0221687 A1 | 8/2012 | Hunter et al. |
| 2012/0226748 A1 | 9/2012 | Bosworth et al. |
| 2012/0229506 A1 | 9/2012 | Nishikawa |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0253858 A1 | 10/2012 | Glissmann et al. |
| 2012/0254325 A1 | 10/2012 | Majeti et al. |
| 2012/0271883 A1 | 10/2012 | Montoya et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0290977 A1 | 11/2012 | Devecka |
| 2012/0295639 A1 | 11/2012 | Fitoussi et al. |
| 2012/0299954 A1 | 11/2012 | Wada et al. |
| 2012/0302256 A1 | 11/2012 | Pai et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0315987 A1 | 12/2012 | Walling |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0031180 A1 | 1/2013 | Abendroth et al. |
| 2013/0036165 A1 | 2/2013 | Tseng et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0073970 A1 | 3/2013 | Piantino et al. |
| 2013/0073971 A1 | 3/2013 | Huang et al. |
| 2013/0073984 A1 | 3/2013 | Lessin et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0103760 A1 | 4/2013 | Golding et al. |
| 2013/0103766 A1 | 4/2013 | Gupta |
| 2013/0104053 A1 | 4/2013 | Thornton et al. |
| 2013/0110631 A1 | 5/2013 | Mitchell et al. |
| 2013/0110641 A1 | 5/2013 | Ormont et al. |
| 2013/0110885 A1 | 5/2013 | Brundrett, III |
| 2013/0111354 A1 | 5/2013 | Marra et al. |
| 2013/0111514 A1 | 5/2013 | Slavin et al. |
| 2013/0124091 A1 | 5/2013 | Matas et al. |
| 2013/0128059 A1 | 5/2013 | Kristensson |
| 2013/0129084 A1 | 5/2013 | Appleton |
| 2013/0129252 A1 | 5/2013 | Lauper |
| 2013/0132477 A1 | 5/2013 | Bosworth et al. |
| 2013/0141463 A1 | 6/2013 | Barnett et al. |
| 2013/0145286 A1 | 6/2013 | Feng et al. |
| 2013/0151988 A1 | 6/2013 | Sorin et al. |
| 2013/0152000 A1 | 6/2013 | Liu et al. |
| 2013/0155169 A1 | 6/2013 | Hoover et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0174059 A1 | 7/2013 | Van Wie et al. |
| 2013/0179520 A1 | 7/2013 | Lee et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0201187 A1 | 8/2013 | Tong et al. |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0249948 A1 | 9/2013 | Reitan |
| 2013/0254900 A1 | 9/2013 | Sathish et al. |
| 2013/0257877 A1 | 10/2013 | Davis |
| 2013/0258040 A1 | 10/2013 | Kaytaz et al. |
| 2013/0260800 A1 | 10/2013 | Asakawa et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0311452 A1 | 11/2013 | Jacoby |
| 2013/0325964 A1 | 12/2013 | Berberat |
| 2013/0332068 A1 | 12/2013 | Kesar et al. |
| 2013/0339868 A1 | 12/2013 | Sharpe et al. |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0011576 A1 | 1/2014 | Barbalet et al. |
| 2014/0019264 A1 | 1/2014 | Wachman et al. |
| 2014/0032682 A1 | 1/2014 | Prado et al. |
| 2014/0039842 A1 | 2/2014 | Yuen et al. |
| 2014/0043204 A1 | 2/2014 | Basnayake et al. |
| 2014/0043329 A1 | 2/2014 | Wang et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0055554 A1 | 2/2014 | Du et al. |
| 2014/0057660 A1 | 2/2014 | Wager |
| 2014/0082651 A1 | 3/2014 | Sharifi |
| 2014/0085293 A1 | 3/2014 | Konoplev et al. |
| 2014/0089771 A1 | 3/2014 | Pilskalns |
| 2014/0089816 A1 | 3/2014 | Dipersia et al. |
| 2014/0092130 A1 | 4/2014 | Anderson et al. |
| 2014/0096029 A1 | 4/2014 | Schultz |
| 2014/0099880 A1 | 4/2014 | Thistoll et al. |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0125678 A1 | 5/2014 | Wang et al. |
| 2014/0129343 A1 | 5/2014 | Finster et al. |
| 2014/0129953 A1 | 5/2014 | Spiegel |
| 2014/0143143 A1 | 5/2014 | Fasoli et al. |
| 2014/0143241 A1 | 5/2014 | Barello et al. |
| 2014/0149519 A1 | 5/2014 | Redfern et al. |
| 2014/0155102 A1 | 6/2014 | Cooper et al. |
| 2014/0157139 A1 | 6/2014 | Coroy et al. |
| 2014/0160149 A1 | 6/2014 | Blackstock et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0199970 A1 | 7/2014 | Klotz |
| 2014/0201527 A1 | 7/2014 | Krivorot |
| 2014/0207679 A1 | 7/2014 | Cho |
| 2014/0214471 A1 | 7/2014 | Schreiner, III |
| 2014/0218394 A1 | 8/2014 | Hochmuth et al. |
| 2014/0221089 A1 | 8/2014 | Fortkort |
| 2014/0222564 A1 | 8/2014 | Kranendonk et al. |
| 2014/0223372 A1 | 8/2014 | Dostie et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |

(56) References Cited

U.S. PATENT DOCUMENTS

| | | |
|---|---|---|
| 2014/0279436 A1 | 9/2014 | Dorsey et al. |
| 2014/0279540 A1 | 9/2014 | Jackson |
| 2014/0280005 A1 | 9/2014 | Powers |
| 2014/0280058 A1 | 9/2014 | St. Clair |
| 2014/0280318 A1 | 9/2014 | Simms et al. |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289216 A1 | 9/2014 | Voellmer et al. |
| 2014/0289249 A1 | 9/2014 | Davis |
| 2014/0289833 A1 | 9/2014 | Briceno |
| 2014/0306884 A1* | 10/2014 | Sano ............ A61B 5/14551 345/156 |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0347368 A1* | 11/2014 | Kishore ............ G01C 21/20 701/538 |
| 2014/0359024 A1 | 12/2014 | Spiegel |
| 2014/0359032 A1 | 12/2014 | Spiegel et al. |
| 2014/0362091 A1 | 12/2014 | Bouaziz et al. |
| 2014/0372420 A1 | 12/2014 | Slep |
| 2014/0380195 A1 | 12/2014 | Graham et al. |
| 2014/0380511 A1 | 12/2014 | Faaborg et al. |
| 2015/0020086 A1 | 1/2015 | Chen et al. |
| 2015/0046278 A1 | 2/2015 | Pei et al. |
| 2015/0058345 A1 | 2/2015 | Mishra et al. |
| 2015/0067880 A1 | 3/2015 | Ward et al. |
| 2015/0071619 A1 | 3/2015 | Brough |
| 2015/0084892 A1 | 3/2015 | Shirota et al. |
| 2015/0086087 A1 | 3/2015 | Ricanek, Jr. et al. |
| 2015/0087263 A1 | 3/2015 | Branscomb et al. |
| 2015/0088464 A1 | 3/2015 | Yuen et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0120237 A1 | 4/2015 | Gouda et al. |
| 2015/0121216 A1* | 4/2015 | Brown ............ G06N 3/006 715/705 |
| 2015/0121251 A1 | 4/2015 | Kadirvel et al. |
| 2015/0123967 A1 | 5/2015 | Quinn et al. |
| 2015/0128020 A1 | 5/2015 | Chávez et al. |
| 2015/0153934 A1 | 6/2015 | Zherebtsov et al. |
| 2015/0155007 A1 | 6/2015 | Barfield, Jr. et al. |
| 2015/0160832 A1 | 6/2015 | Walkin et al. |
| 2015/0169139 A1 | 6/2015 | Leva et al. |
| 2015/0169142 A1 | 6/2015 | Longo et al. |
| 2015/0169827 A1 | 6/2015 | Laborde |
| 2015/0169938 A1 | 6/2015 | Yao et al. |
| 2015/0172393 A1 | 6/2015 | Oplinger et al. |
| 2015/0172534 A1 | 6/2015 | Miyakawa et al. |
| 2015/0178260 A1 | 6/2015 | Brunson |
| 2015/0181380 A1 | 6/2015 | Altman et al. |
| 2015/0186531 A1 | 7/2015 | Agarwal et al. |
| 2015/0187100 A1* | 7/2015 | Berry ............ G01C 21/3889 345/634 |
| 2015/0193522 A1 | 7/2015 | Choi et al. |
| 2015/0193585 A1 | 7/2015 | Sunna |
| 2015/0193819 A1 | 7/2015 | Chang |
| 2015/0195235 A1 | 7/2015 | Trussel et al. |
| 2015/0199082 A1 | 7/2015 | Scholler et al. |
| 2015/0201030 A1 | 7/2015 | Longo et al. |
| 2015/0206349 A1 | 7/2015 | Rosenthal et al. |
| 2015/0213604 A1 | 7/2015 | Li et al. |
| 2015/0220774 A1 | 8/2015 | Ebersman et al. |
| 2015/0222814 A1 | 8/2015 | Li et al. |
| 2015/0227602 A1 | 8/2015 | Ramu et al. |
| 2015/0232065 A1 | 8/2015 | Ricci et al. |
| 2015/0234942 A1 | 8/2015 | Harmon |
| 2015/0237473 A1 | 8/2015 | Koepke |
| 2015/0245168 A1 | 8/2015 | Martin |
| 2015/0261917 A1 | 9/2015 | Smith |
| 2015/0264432 A1 | 9/2015 | Cheng |
| 2015/0268830 A1 | 9/2015 | Martynov |
| 2015/0295866 A1 | 10/2015 | Collet et al. |
| 2015/0301579 A1 | 10/2015 | Vaccari et al. |
| 2015/0304806 A1 | 10/2015 | Vincent |
| 2015/0312184 A1 | 10/2015 | Langholz et al. |
| 2015/0334077 A1 | 11/2015 | Feldman |
| 2015/0347519 A1 | 12/2015 | Hornkvist et al. |
| 2015/0350136 A1 | 12/2015 | Flynn, III et al. |
| 2015/0350262 A1 | 12/2015 | Rainisto et al. |
| 2015/0365795 A1 | 12/2015 | Allen et al. |
| 2015/0369623 A1 | 12/2015 | Blumenberg et al. |
| 2015/0370830 A1 | 12/2015 | Murphy-Chutorian et al. |
| 2015/0378502 A1 | 12/2015 | Hu et al. |
| 2016/0006927 A1 | 1/2016 | Sehn |
| 2016/0012066 A1 | 1/2016 | Ning et al. |
| 2016/0014063 A1 | 1/2016 | Hogeg et al. |
| 2016/0021153 A1 | 1/2016 | Hull et al. |
| 2016/0028471 A1 | 1/2016 | Boss et al. |
| 2016/0035111 A1 | 2/2016 | Ingrassia et al. |
| 2016/0045834 A1 | 2/2016 | Burns |
| 2016/0055164 A1 | 2/2016 | Cantarero et al. |
| 2016/0063537 A1 | 3/2016 | Kumar Goel |
| 2016/0078095 A1 | 3/2016 | Man et al. |
| 2016/0080438 A1 | 3/2016 | Liang |
| 2016/0085773 A1 | 3/2016 | Chang et al. |
| 2016/0085863 A1 | 3/2016 | Allen et al. |
| 2016/0086500 A1 | 3/2016 | Kaleal, III |
| 2016/0086670 A1 | 3/2016 | Gross et al. |
| 2016/0093078 A1 | 3/2016 | Davis et al. |
| 2016/0099901 A1 | 4/2016 | Allen et al. |
| 2016/0134840 A1 | 5/2016 | Mcculloch |
| 2016/0158600 A1 | 6/2016 | Rolley |
| 2016/0163084 A1 | 6/2016 | Corazza et al. |
| 2016/0164823 A1 | 6/2016 | Nordstrom et al. |
| 2016/0179823 A1 | 6/2016 | Yang |
| 2016/0180887 A1 | 6/2016 | Sehn |
| 2016/0182422 A1 | 6/2016 | Sehn et al. |
| 2016/0182875 A1 | 6/2016 | Sehn |
| 2016/0188997 A1 | 6/2016 | Desnoyer et al. |
| 2016/0189310 A1 | 6/2016 | O'kane |
| 2016/0210500 A1 | 7/2016 | Feng et al. |
| 2016/0212071 A1 | 7/2016 | Hannah et al. |
| 2016/0217292 A1 | 7/2016 | Faaborg et al. |
| 2016/0234060 A1 | 8/2016 | Pai et al. |
| 2016/0234149 A1 | 8/2016 | Tsuda et al. |
| 2016/0239248 A1 | 8/2016 | Sehn |
| 2016/0241504 A1 | 8/2016 | Raji et al. |
| 2016/0275721 A1 | 9/2016 | Park et al. |
| 2016/0277419 A1 | 9/2016 | Allen et al. |
| 2016/0286244 A1 | 9/2016 | Chang et al. |
| 2016/0292273 A1 | 10/2016 | Murphy et al. |
| 2016/0292905 A1 | 10/2016 | Nehmadi et al. |
| 2016/0294891 A1 | 10/2016 | Miller |
| 2016/0298982 A1 | 10/2016 | Baillang |
| 2016/0313957 A1 | 10/2016 | Ebert et al. |
| 2016/0321708 A1 | 11/2016 | Sehn |
| 2016/0343160 A1 | 11/2016 | Blattner et al. |
| 2016/0350297 A1 | 12/2016 | Riza |
| 2016/0356617 A1 | 12/2016 | Verosub et al. |
| 2016/0359957 A1 | 12/2016 | Laliberte |
| 2016/0359987 A1 | 12/2016 | Laliberte |
| 2016/0359993 A1 | 12/2016 | Hendrickson et al. |
| 2016/0378278 A1 | 12/2016 | Sirpal |
| 2017/0006094 A1 | 1/2017 | Abou Mahmoud et al. |
| 2017/0006322 A1 | 1/2017 | Dury et al. |
| 2017/0010768 A1 | 1/2017 | Watson et al. |
| 2017/0027528 A1 | 2/2017 | Kaleal, III et al. |
| 2017/0034173 A1 | 2/2017 | Miller et al. |
| 2017/0039452 A1 | 2/2017 | Osindero et al. |
| 2017/0039752 A1 | 2/2017 | Quinn et al. |
| 2017/0061308 A1 | 3/2017 | Chen et al. |
| 2017/0061476 A1 | 3/2017 | Manouchehri et al. |
| 2017/0064240 A1 | 3/2017 | Mangat et al. |
| 2017/0076217 A1 | 3/2017 | Krumm et al. |
| 2017/0076328 A1 | 3/2017 | Suzuki |
| 2017/0080346 A1 | 3/2017 | Abbas |
| 2017/0087473 A1 | 3/2017 | Siegel et al. |
| 2017/0113140 A1 | 4/2017 | Blackstock et al. |

(56) References Cited

U.S. PATENT DOCUMENTS

| | | | |
|---|---|---|---|
| 2017/0118145 A1 | 4/2017 | Aittoniemi et al. |
| 2017/0124116 A1 | 5/2017 | League |
| 2017/0126592 A1 | 5/2017 | El Ghoul |
| 2017/0132649 A1 | 5/2017 | Oliva et al. |
| 2017/0161382 A1 | 6/2017 | Ouimet et al. |
| 2017/0161745 A1 | 6/2017 | Hawkins |
| 2017/0192637 A1* | 7/2017 | Ren .................... G06F 3/04817 |
| 2017/0199855 A1 | 7/2017 | Fishbeck |
| 2017/0206470 A1 | 7/2017 | Marculescu et al. |
| 2017/0235848 A1 | 8/2017 | Van Deusen et al. |
| 2017/0263029 A1 | 9/2017 | Yan et al. |
| 2017/0286752 A1 | 10/2017 | Gusarov et al. |
| 2017/0287006 A1 | 10/2017 | Azmoodeh et al. |
| 2017/0293673 A1 | 10/2017 | Purumala et al. |
| 2017/0295250 A1 | 10/2017 | Samaranayake et al. |
| 2017/0297201 A1 | 10/2017 | Shionozaki et al. |
| 2017/0310934 A1 | 10/2017 | Du et al. |
| 2017/0312634 A1 | 11/2017 | Ledoux et al. |
| 2017/0324688 A1 | 11/2017 | Collet et al. |
| 2017/0336960 A1 | 11/2017 | Chaudhri et al. |
| 2017/0339006 A1 | 11/2017 | Austin et al. |
| 2017/0352179 A1 | 12/2017 | Hardee et al. |
| 2017/0353477 A1 | 12/2017 | Faigon et al. |
| 2017/0371883 A1 | 12/2017 | Bailiang et al. |
| 2017/0374003 A1 | 12/2017 | Allen et al. |
| 2017/0374508 A1 | 12/2017 | Davis et al. |
| 2018/0005420 A1 | 1/2018 | Bondich et al. |
| 2018/0024726 A1 | 1/2018 | Hviding |
| 2018/0025367 A1 | 1/2018 | Jain |
| 2018/0032212 A1 | 2/2018 | Choi et al. |
| 2018/0047200 A1 | 2/2018 | O'hara et al. |
| 2018/0060363 A1 | 3/2018 | Ko et al. |
| 2018/0068019 A1 | 3/2018 | Novikoff et al. |
| 2018/0069817 A1 | 3/2018 | Constantinides |
| 2018/0088777 A1 | 3/2018 | Daze et al. |
| 2018/0091732 A1 | 3/2018 | Wilson et al. |
| 2018/0097762 A1 | 4/2018 | Garcia et al. |
| 2018/0113587 A1 | 4/2018 | Allen et al. |
| 2018/0115503 A1 | 4/2018 | Baldwin et al. |
| 2018/0129962 A1 | 5/2018 | Mathew et al. |
| 2018/0205681 A1 | 7/2018 | Gong et al. |
| 2018/0308023 A1 | 10/2018 | Bansal et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0335311 A1 | 11/2018 | Van Os et al. |
| 2019/0001223 A1 | 1/2019 | Blackstock et al. |
| 2019/0057616 A1 | 2/2019 | Cohen et al. |
| 2019/0114554 A1 | 4/2019 | Chen et al. |
| 2019/0188920 A1 | 6/2019 | Mcphee et al. |
| 2019/0220932 A1 | 7/2019 | Amitay et al. |
| 2020/0117339 A1 | 4/2020 | Amitay et al. |
| 2020/0117340 A1 | 4/2020 | Amitay et al. |
| 2020/0120097 A1 | 4/2020 | Amitay et al. |
| 2020/0120170 A1 | 4/2020 | Amitay et al. |
| 2020/0160571 A1 | 5/2020 | Burrows et al. |
| 2020/0404464 A1 | 12/2020 | Constantinides |
| 2021/0243548 A1 | 8/2021 | Brody et al. |
| 2021/0266277 A1 | 8/2021 | Allen et al. |
| 2021/0286840 A1 | 9/2021 | Amitay et al. |
| 2021/0357104 A1 | 11/2021 | Amitay et al. |
| 2022/0291812 A1 | 9/2022 | Amitay et al. |
| 2023/0021727 A1 | 1/2023 | Amitay et al. |
| 2023/0051468 A1 | 2/2023 | Amitay et al. |
| 2023/0067248 A1 | 3/2023 | Amitay et al. |
| 2023/0113334 A1 | 4/2023 | Amitay et al. |
| 2023/0280879 A1 | 9/2023 | Amitay et al. |

FOREIGN PATENT DOCUMENTS

| | | |
|---|---|---|
| CN | 101363743 A | 2/2009 |
| CN | 102037716 A | 4/2011 |
| CN | 102450031 A | 5/2012 |
| CN | 102461218 A | 5/2012 |
| CN | 102664819 A | 9/2012 |
| CN | 103116853 A | 5/2013 |
| CN | 103124894 A | 5/2013 |
| CN | 103154994 A | 6/2013 |
| CN | 104054077 A | 9/2014 |
| CN | 104137128 | 11/2014 |
| CN | 104205854 | 12/2014 |
| CN | 104508426 A | 4/2015 |
| CN | 104616540 A | 5/2015 |
| CN | 104854615 A | 8/2015 |
| CN | 105075282 | 11/2015 |
| CN | 105554311 A | 5/2016 |
| CN | 105893579 A | 8/2016 |
| CN | 105897565 A | 8/2016 |
| CN | 106066990 A | 11/2016 |
| CN | 106157155 A | 11/2016 |
| CN | 106530008 A | 3/2017 |
| CN | 107210948 A | 9/2017 |
| CN | 108885795 A | 11/2018 |
| CN | 109863532 A | 6/2019 |
| CN | 110168478 A | 8/2019 |
| CN | 110799937 A | 2/2020 |
| CN | 110800018 A | 2/2020 |
| CN | 110832538 A | 2/2020 |
| CN | 110945555 A | 3/2020 |
| CN | 111010882 A | 4/2020 |
| CN | 111343075 A | 6/2020 |
| CN | 111489264 A | 8/2020 |
| CN | 111343075 B | 9/2022 |
| CN | 111010882 B | 11/2023 |
| EP | 2051480 A1 | 4/2009 |
| EP | 2151797 A1 | 2/2010 |
| EP | 2184092 A2 | 5/2010 |
| GB | 2399928 A | 9/2004 |
| JP | 2001230801 A | 8/2001 |
| JP | 2014006881 A | 1/2014 |
| JP | 5497931 B2 | 3/2014 |
| JP | 2014191414 A | 10/2014 |
| KR | 19990073076 A | 10/1999 |
| KR | 20010078417 A | 8/2001 |
| KR | 20040063436 A | 7/2004 |
| KR | 1020050036963 A | 4/2005 |
| KR | 20060124865 A | 12/2006 |
| KR | 20110014224 A | 2/2011 |
| KR | 20110054492 A | 5/2011 |
| KR | 101060961 B1 | 8/2011 |
| KR | 1020120070898 A | 7/2012 |
| KR | 20130075380 A | 7/2013 |
| KR | 20130089819 A | 8/2013 |
| KR | 20130111868 A | 10/2013 |
| KR | 20140015725 A | 2/2014 |
| KR | 20140095525 A | 8/2014 |
| KR | 101445263 B1 | 9/2014 |
| KR | 20150082440 A | 7/2015 |
| KR | 101548880 B1 | 9/2015 |
| KR | 20160001847 A | 1/2016 |
| KR | 20160018954 A | 2/2016 |
| KR | 101604654 B1 | 3/2016 |
| KR | 20160028636 A | 3/2016 |
| KR | 20160051536 A | 5/2016 |
| KR | 20160082915 A | 7/2016 |
| KR | 20160087222 A | 7/2016 |
| KR | 20160103398 A | 9/2016 |
| KR | 101664941 B1 | 10/2016 |
| KR | 20160140700 A | 12/2016 |
| KR | 101698031 B1 | 1/2017 |
| KR | 101721114 B1 | 3/2017 |
| KR | 20170025454 A | 3/2017 |
| KR | 20170035657 A | 3/2017 |
| KR | 20170037655 A | 4/2017 |
| KR | 102434361 B1 | 8/2022 |
| KR | 102449545 B1 | 10/2022 |
| KR | 102455041 B1 | 10/2022 |
| KR | 102486490 B1 | 1/2023 |
| KR | 102515132 B1 | 3/2023 |
| KR | 102664838 | 5/2024 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |

(56) References Cited

FOREIGN PATENT DOCUMENTS

| | | |
|---|---|---|
| WO | WO-2001050703 A3 | 7/2001 |
| WO | WO-2003094072 A1 | 11/2003 |
| WO | WO-2004079530 A2 | 9/2004 |
| WO | WO-2004095308 A1 | 11/2004 |
| WO | WO-2006107182 A1 | 10/2006 |
| WO | WO-2006118755 A2 | 11/2006 |
| WO | WO-2007092668 A2 | 8/2007 |
| WO | WO-2007134402 A1 | 11/2007 |
| WO | WO-2009043020 A2 | 4/2009 |
| WO | WO-2011040821 A1 | 4/2011 |
| WO | WO-2011119407 A1 | 9/2011 |
| WO | WO-2012000107 A1 | 1/2012 |
| WO | WO-2012139276 A1 | 10/2012 |
| WO | WO-2013008238 A1 | 1/2013 |
| WO | WO-2013008251 A2 | 1/2013 |
| WO | WO-2013027893 A1 | 2/2013 |
| WO | WO-2013045753 A1 | 4/2013 |
| WO | WO-2013152454 A1 | 10/2013 |
| WO | WO-2013166588 A1 | 11/2013 |
| WO | WO-2014006129 A1 | 1/2014 |
| WO | WO-2014031899 A1 | 2/2014 |
| WO | WO-2014068573 A1 | 5/2014 |
| WO | WO-2014115136 A1 | 7/2014 |
| WO | WO-2014194262 A2 | 12/2014 |
| WO | WO-2014194439 A1 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016090605 A1 | 6/2016 |
| WO | WO-2016100318 A2 | 6/2016 |
| WO | WO-2016100318 A3 | 6/2016 |
| WO | WO-2016100342 A1 | 6/2016 |
| WO | WO-2016/112299 A1 | 7/2016 |
| WO | WO-2016149594 A1 | 9/2016 |
| WO | WO-2016179166 A1 | 11/2016 |
| WO | WO-2016179235 A1 | 11/2016 |
| WO | WO-2017034309 A1 | 3/2017 |
| WO | WO-2017173319 A1 | 10/2017 |
| WO | WO-2017176739 A1 | 10/2017 |
| WO | WO-2017176992 A1 | 10/2017 |
| WO | WO-2018005644 A1 | 1/2018 |
| WO | WO-2018006053 A1 | 1/2018 |
| WO | WO-2018081013 A1 | 5/2018 |
| WO | WO-2018102562 A1 | 6/2018 |
| WO | WO-2018129531 A1 | 7/2018 |
| WO | WO-2018200042 A1 | 11/2018 |
| WO | WO-2018200043 A1 | 11/2018 |
| WO | WO-2018201102 A1 | 11/2018 |
| WO | WO-2018201104 A1 | 11/2018 |
| WO | WO-2018201106 A1 | 11/2018 |
| WO | WO-2018201107 A1 | 11/2018 |
| WO | WO-2018201108 A1 | 11/2018 |
| WO | WO-2018201109 A1 | 11/2018 |
| WO | WO-2019089613 A1 | 5/2019 |

OTHER PUBLICATIONS

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 12/471,811, Advisory Action dated Mar. 28, 2012", 6 pgs.

"U.S. Appl. No. 12/471,811, Examiner Interview Summary dated Feb. 2, 2012", 3 pgs.

"U.S. Appl. No. 12/471,811, Examiner Interview Summary dated Apr. 18, 2011", 3 pgs.

"U.S. Appl. No. 12/471,811, Examiner Interview Summary dated May 27, 2014", 2 pgs.

"U.S. Appl. No. 12/471,811, Final Office Action dated Dec. 23, 2011", 20 pgs.

"U.S. Appl. No. 12/471,811, Non Final Office Action dated Jan. 13, 2011", 15 pgs.

"U.S. Appl. No. 12/471,811, Non Final Office Action dated Jun. 28, 2011", 26 pgs.

"U.S. Appl. No. 12/471,811, Non Final Office Action dated Oct. 24, 2014", 21 pgs.

"U.S. Appl. No. 12/471,811, Notice of Allowance dated Apr. 1, 2015", 6 pgs.

"U.S. Appl. No. 12/471,811, Response filed Jan. 26, 2015 to Non Final Office Action dated Oct. 24, 2014", 18 pgs.

"U.S. Appl. No. 12/471,811, Response filed Feb. 23, 2012 to Final Office Action dated Dec. 23, 2011", 12 pgs.

"U.S. Appl. No. 12/471,811, Response filed Mar. 28, 2012 to Advisory Action dated Mar. 28, 2012", 14 pgs.

"U.S. Appl. No. 12/471,811, Response filed Apr. 13, 2011 to Non Final Office Action dated Jan. 13, 2011", 5 pgs.

"U.S. Appl. No. 12/471,811, Response filed Sep. 28, 2011 to Non Final Office Action dated Jun. 28, 2011", 19 pgs.

"U.S. Appl. No. 13/979,974, Corrected Notice of Allowability dated Nov. 19, 2018", 2 pgs.

"U.S. Appl. No. 13/979,974, Examiner Interview Summary dated Jun. 29, 2017", 3 pgs.

"U.S. Appl. No. 13/979,974, Examiner Interview Summary mailed Sep. 15, 2017", 3 pgs.

"U.S. Appl. No. 13/979,974, Final Office Action dated Apr. 25, 2018", 18 pgs.

"U.S. Appl. No. 13/979,974, Final Office Action dated Jun. 9, 2017", 20 pgs.

"U.S. Appl. No. 13/979,974, Final Office Action mailed Oct. 12, 16", 13 pgs.

"U.S. Appl. No. 13/979,974, Non Final Office Action dated Feb. 22, 2017", 17 pgs.

"U.S. Appl. No. 13/979,974, Non Final Office Action dated Apr. 27, 2016", 16 pgs.

"U.S. Appl. No. 13/979,974, Non Final Office Action mailed Oct. 3, 17", 17 pgs.

"U.S. Appl. No. 13/979,974, Notice of Allowance dated Aug. 10, 2018", 9 pgs.

"U.S. Appl. No. 13/979,974, Response filed Jan. 3, 2018 to Non Final Office Action dated Oct. 3, 2017", 8 pgs.

"U.S. Appl. No. 13/979,974, Response filed May 22, 2017 to Non Final Office Action dated Feb. 22, 2017", 10 pgs.

"U.S. Appl. No. 13/979,974, Response filed Jul. 25, 2018 to Final Office Action dated Apr. 25, 2018", 10 pgs.

"U.S. Appl. No. 13/979,974, Response filed Jul. 26, 2016 to Non Final Office Action dated Apr. 27, 2016", 8 pgs.

"U.S. Appl. No. 13/979,974, Response filed Sep. 11, 2017 to Final Office Action dated Jun. 9, 2017", 8 pgs.

"U.S. Appl. No. 13/979,974, Response filed Jan. 12, 2017 to Non Final Office Action dated Apr. 27, 2016", 8 pgs.

"U.S. Appl. No. 14/753,200, Non Final Office Action mailed Oct. 11, 16", 6 pgs.

"U.S. Appl. No. 14/753,200, Notice of Allowance dated Apr. 27, 2017", 7 pgs.

"U.S. Appl. No. 14/753,200, Response filed Feb. 13, 2017 to Non Final Office Action dated Oct. 11, 2016", 9 pgs.

"U.S. Appl. No. 15/086,749, Final Office Action dated Oct. 31, 2017", 15 pgs.

"U.S. Appl. No. 15/086,749, Final Office Action dated Dec. 31, 2018", 14 pgs.

"U.S. Appl. No. 15/086,749, Non Final Office Action dated Mar. 13, 2017", 12 pgs.

"U.S. Appl. No. 15/086,749, Non Final Office Action dated Apr. 30, 2018", 14 pgs.

"U.S. Appl. No. 15/086,749, Notice of Allowance dated Feb. 26, 2019", 7 pgs.

"U.S. Appl. No. 15/086,749, Response filed Feb. 11, 2019 to Final Office Action dated Dec. 31, 2018", 10 pgs.

"U.S. Appl. No. 15/086,749, Response filed Apr. 2, 2018 to Final Office Action dated Oct. 31, 2017", 14 pgs.

"U.S. Appl. No. 15/086,749, Response filed Aug. 29, 2018 to Non Final Office Action dated Apr. 30, 2018", 12 pgs.

"U.S. Appl. No. 15/199,472, Final Office Action dated Mar. 1, 2018", 31 pgs.

(56) References Cited

OTHER PUBLICATIONS

"U.S. Appl. No. 15/199,472, Final Office Action dated Nov. 15, 2018", 37 pgs.
"U.S. Appl. No. 15/199,472, Non Final Office Action mailed Jul. 25, 17", 30 pgs.
"U.S. Appl. No. 15/199,472, Non Final Office Action dated Sep. 21, 2018", 33 pgs.
"U.S. Appl. No. 15/199,472, Notice of Allowance dated Mar. 18, 2019", 23 pgs.
"U.S. Appl. No. 15/199,472, Response filed Jan. 15, 2019 to Final Office Action dated Nov. 15, 2018", 14 pgs.
"U.S. Appl. No. 15/199,472, Response filed Jan. 25, 2018 to Non Final Office Action dated Jul. 25, 2017", 13 pgs.
"U.S. Appl. No. 15/199,472, Response filed Aug. 31, 2018 to Final Office Action dated Mar. 1, 2018", 14 pgs.
"U.S. Appl. No. 15/199,472, Response filed Oct. 17, 2018 to Non Final Office Action dated Sep. 31, 2018", 11 pgs.
"U.S. Appl. No. 15/365,046, Non Final Office Action dated Dec. 20, 2018", 36 pgs.
"U.S. Appl. No. 15/365,046, Response filed Mar. 20, 2019 to Non Final Office Action dated Dec. 20, 2018", 20 pgs.
"U.S. Appl. No. 15/369,499, Corrected Notice of Allowability dated Jan. 28, 2021", 3 pgs.
"U.S. Appl. No. 15/369,499, Examiner Interview Summary dated Sep. 21, 2020", 3 pgs.
"U.S. Appl. No. 15/369,499, Examiner Interview Summary dated Oct. 9, 2020", 2 pgs.
"U.S. Appl. No. 15/369,499, Final Office Action dated Jan. 31, 2019", 22 pgs.
"U.S. Appl. No. 15/369,499, Final Office Action dated Jun. 15, 2020", 17 pgs.
"U.S. Appl. No. 15/369,499, Final Office Action dated Oct. 1, 2019", 17 pgs.
"U.S. Appl. No. 15/369,499, Non Final Office Action dated Mar. 2, 2020", 17 pgs.
"U.S. Appl. No. 15/369,499, Non Final Office Action dated Jun. 17, 2019", 17 pgs.
"U.S. Appl. No. 15/369,499, Non Final Office Action dated Aug. 15, 2018", 22 pgs.
"U.S. Appl. No. 15/369,499, Notice of Allowance dated Oct. 26, 2020", 17 pgs.
"U.S. Appl. No. 15/369,499, Response filed Feb. 3, 2020 to Final Office Action dated Oct. 1, 2019", 10 pgs.
"U.S. Appl. No. 15/369,499, Response filed Mar. 14, 2019 to Final Office Action dated Jan. 31, 2019", 12 pgs.
"U.S. Appl. No. 15/369,499, Response filed Jun. 2, 2020 to Non Final Office Action dated Mar. 2, 2020", 9 pgs.
"U.S. Appl. No. 15/369,499, Response filed Sep. 15, 2020 to Final Office Action dated Jun. 15, 2020", 10 pgs.
"U.S. Appl. No. 15/369,499, Response filed Nov. 15, 2018 to Non Final Office Action dated Aug. 15, 2018", 10 pgs.
"U.S. Appl. No. 15/369,499, Response filed Sep. 10, 2019 to Non-Final Office Action dated Jun. 17, 2019", 9 pgs.
"U.S. Appl. No. 15/583,142, Jan. 28, 2019 to Response Filed Non Final Office Action dated Oct. 25, 2018", 19 pgs.
"U.S. Appl. No. 15/583,142, Final Office Action dated Mar. 22, 2019", 11 pgs.
"U.S. Appl. No. 15/583,142, Non Final Office Action dated Oct. 25, 2018", 14 pgs.
"U.S. Appl. No. 15/628,408, Corrected Notice of Allowability dated Jul. 21, 2021", 7 pgs.
"U.S. Appl. No. 15/628,408, Final Office Action dated Apr. 13, 2020", 45 pgs.
"U.S. Appl. No. 15/628,408, Final Office Action dated Jun. 10, 2019", 44 pgs.
"U.S. Appl. No. 15/628,408, Final Office Action dated Jun. 10, 2022", 33 pgs.
"U.S. Appl. No. 15/628,408, Non Final Office Action dated Jan. 2, 2019", 28 pgs.
"U.S. Appl. No. 15/628,408, Non Final Office Action dated Feb. 4, 2022", 30 pgs.
"U.S. Appl. No. 15/628,408, Non Final Office Action dated Oct. 30, 2019", 45 pgs.
"U.S. Appl. No. 15/628,408, Notice of Allowance dated Jul. 8, 2021", 11 pgs.
"U.S. Appl. No. 15/628,408, Notice of Allowance dated Sep. 29, 2020", 13 pgs.
"U.S. Appl. No. 15/628,408, Response filled Jan. 30, 2020 to Non Final Office Action dated Oct. 30, 2019", 17 pgs.
"U.S. Appl. No. 15/628,408, Response filed Apr. 2, 2019 to Non Final Office Action dated Jan. 2, 2019", 15 pgs.
"U.S. Appl. No. 15/628,408, Response filed May 4, 2022 to Non Final Office Action dated Feb. 4, 2022", 9 pgs.
"U.S. Appl. No. 15/628,408, Response filed Jul. 13, 2020 to Final Office Action dated Apr. 13, 2020", 20 pgs.
"U.S. Appl. No. 15/628,408, Response filed Aug. 12, 2019 to Final Office Action dated Jun. 10, 2019", 12 pgs.
"U.S. Appl. No. 15/628,408, Supplemental Amendment filed Apr. 4, 2019 to Non Final Office Action dated Jan. 2, 2019", 12 pgs.
"U.S. Appl. No. 15/628,408, Supplemental Notice of Allowability dated Oct. 21, 2021", 2 pgs.
"U.S. Appl. No. 15/661,953, Examiner Interview Summary dated Nov. 13, 2018", 3 pgs.
"U.S. Appl. No. 15/661,953, Non Final Office Action dated Mar. 26, 2018", 6 pgs.
"U.S. Appl. No. 15/661,953, Notice of Allowance dated Aug. 10, 2018", 7 pgs.
"U.S. Appl. No. 15/661,953, PTO Response to Rule 312 Communication dated Oct. 30, 2018", 2 pgs.
"U.S. Appl. No. 15/661,953, PTO Response to Rule 312 Communication dated Nov. 7, 2018", 2 pgs.
"U.S. Appl. No. 15/661,953, Response Filed Jun. 26, 2018 to Non Final Office Action dated Mar. 26, 2018", 13 pgs.
"U.S. Appl. No. 15/859,101, Examiner Interview Summary dated Sep. 18, 2018", 3 pgs.
"U.S. Appl. No. 15/859,101, Non Final Office Action dated Jun. 15, 2018", 10 pgs.
"U.S. Appl. No. 15/859,101, Notice of Allowance dated Oct. 4, 2018", 9 pgs.
"U.S. Appl. No. 15/859,101, Response filed Sep. 17, 2018 to Non Final Office Action dated Jun. 15, 2018", 17 pgs.
"U.S. Appl. No. 15/901,387, Non Final Office Action dated Oct. 30, 2019", 40 pgs.
"U.S. Appl. No. 15/965,361, Non Final Office Action dated Jun. 22, 2020", 35 pgs.
"U.S. Appl. No. 15/965,466, Final Office Action dated May 18, 2021", 18 pgs.
"U.S. Appl. No. 15/965,466, Non Final Office Action dated Nov. 20, 2020", 17 pgs.
"U.S. Appl. No. 15/965,466, Non Final Office Action dated Dec. 15, 2021", 15 pgs.
"U.S. Appl. No. 15/965,466, Response filed Mar. 22, 2021 to Non Final Office Action dated Nov. 20, 2020", 13 pgs.
"U.S. Appl. No. 15/965,466, Response filed Jun. 15, 2022 to Non Final Office Action dated Dec. 15, 2021", 13 pgs.
"U.S. Appl. No. 15/965,466, Response filed Oct. 18, 2021 to Final Office Action dated May 18, 2021", 12 pgs.
"U.S. Appl. No. 15/965,744, Examiner Interview Summary dated Feb. 21, 2020", 3 pgs.
"U.S. Appl. No. 15/965,744, Final Office Action dated Feb. 6, 2020", 19 pgs.
"U.S. Appl. No. 15/965,744, Final Office Action dated Jul. 28, 2021", 29 pgs.
"U.S. Appl. No. 15/965,744, Non Final Office Action dated Feb. 1, 2021", 29 pgs.
"U.S. Appl. No. 15/965,744, Non Final Office Action dated Mar. 4, 2022", 31 pgs.
"U.S. Appl. No. 15/965,744, Non Final Office Action dated Jun. 12, 2019", 18 pgs.
"U.S. Appl. No. 15/965,744, Response filed Jun. 1, 2021 to Non Final Office Action dated Feb. 1, 2021", 11 pgs.

(56) References Cited

OTHER PUBLICATIONS

"U.S. Appl. No. 15/965,744, Response filed Jun. 8, 2020 to Final Office Action dated Feb. 6, 2020", 11 pgs.

"U.S. Appl. No. 15/965,744, Response filed Nov. 12, 2019 to Non Final Office Action dated Jun. 12, 2019", 10 pgs.

"U.S. Appl. No. 15/965,744, Response filed Nov. 29, 2021 to Final Office Action dated Jul. 28, 2021", 13 pgs.

"U.S. Appl. No. 15/965,749, Corrected Notice of Allowability dated Jun. 16, 2022", 2 pgs.

"U.S. Appl. No. 15/965,749, Examiner Interview Summary dated Jul. 29, 2020", 3 pgs.

"U.S. Appl. No. 15/965,749, Final Office Action dated Jun. 11, 2020", 12 pgs.

"U.S. Appl. No. 15/965,749, Non Final Office Action dated Jan. 27, 2020", 9 pgs.

"U.S. Appl. No. 15/965,749, Non Final Office Action dated Jul. 9, 2021", 14 pgs.

"U.S. Appl. No. 15/965,749, Non Final Office Action dated Jul. 10, 2019", 8 pgs.

"U.S. Appl. No. 15/965,749, Non Final Office Action dated Nov. 30, 2020", 13 pgs.

"U.S. Appl. No. 15/965,749, Notice of Allowance dated Feb. 2, 2022", 25 pgs.

"U.S. Appl. No. 15/965,749, Response filed Feb. 28, 2020 to Non Final Office Action dated Jan. 27, 2020", 12 pgs.

"U.S. Appl. No. 15/965,749, Response filed Mar. 30, 2021 to Non Final Office Action dated Nov. 30, 2020", 13 pgs.

"U.S. Appl. No. 15/965,749, Response filed Oct. 10, 2019 to Non-Final Office Action dated Jul. 10, 2019", 11 pgs.

"U.S. Appl. No. 15/965,749, Response filed Oct. 12, 2020 to Final Office Action dated Jun. 11, 2020", 14 pgs.

"U.S. Appl. No. 15/965,749, Response filed Nov. 9, 2021 to Non Final Office Action dated Jul. 9, 2021", 14 pgs.

"U.S. Appl. No. 15/965,749, Supplemental Notice of Allowability dated Apr. 7, 2022", 3 pgs.

"U.S. Appl. No. 15/965,749, Supplemental Notice of Allowability dated May 5, 2022", 3 pgs.

"U.S. Appl. No. 15/965,754, Corrected Notice of Allowability dated Jan. 6, 2021", 2 pgs.

"U.S. Appl. No. 15/965,754, Corrected Notice of Allowability dated Mar. 1, 2021", 2 pgs.

"U.S. Appl. No. 15/965,754, Final Office Action dated Jul. 17, 2020", 14 pgs.

"U.S. Appl. No. 15/965,754, Non Final Office Action dated Mar. 30, 2020", 13 pgs.

"U.S. Appl. No. 15/965,754, Notice of Allowance dated Nov. 16, 2020", 7 pgs.

"U.S. Appl. No. 15/965,754, Response filed Jun. 30, 2020 to Non Final Office Action dated Mar. 30, 2020", 12 pgs.

"U.S. Appl. No. 15/965,754, Response filed Oct. 19, 2020 to Final Office Action dated Jul. 17, 2020", 14 pgs.

"U.S. Appl. No. 15/965,754, Supplemental Notice of Allowability dated Dec. 16, 2020", 2 pgs.

"U.S. Appl. No. 15/965,756, Final Office Action dated Aug. 19, 2021", 17 pgs.

"U.S. Appl. No. 15/965,756, Non Final Office Action dated Jan. 13, 2021", 16 pgs.

"U.S. Appl. No. 15/965,756, Non Final Office Action dated Mar. 31, 2022", 17 pgs.

"U.S. Appl. No. 15/965,756, Non Final Office Action mailed Jun. 24, 2020", 16 pgs.

"U.S. Appl. No. 15/965,756, Response filed May 13, 2021 to Non Final Office Action dated Jan. 13, 2021", 12 pgs.

"U.S. Appl. No. 15/965,756, Response filed Sep. 24, 2020 to Non Final Office Action dated Jun. 24, 2020", 11 pgs.

"U.S. Appl. No. 15/965,756, Response filed Dec. 20, 2021 to Final Office Action dated Aug. 19, 2021", 13 pgs.

"U.S. Appl. No. 15/965,764, Corrected Notice of Allowability dated Mar. 30, 2022", 1 pg.

"U.S. Appl. No. 15/965,764, Corrected Notice of Allowability dated Apr. 20, 2022", 2 pgs.

"U.S. Appl. No. 15/965,764, Corrected Notice of Allowability dated Jun. 28, 2022", 2 pgs.

"U.S. Appl. No. 15/965,764, Examiner Interview Summary dated Aug. 6, 2020", 3 pgs.

"U.S. Appl. No. 15/965,764, Final Office Action dated May 14, 2020", 18 pgs.

"U.S. Appl. No. 15/965,764, Final Office Action dated Jun. 15, 2021", 19 pgs.

"U.S. Appl. No. 15/965,764, Non Final Office Action dated Jan. 2, 2020", 18 pgs.

"U.S. Appl. No. 15/965,764, Non Final Office Action dated Feb. 22, 2021", 18 pgs.

"U.S. Appl. No. 15/965,764, Notice of Allowance dated Mar. 9, 2022", 8 pgs.

"U.S. Appl. No. 15/965,764, Response filed Apr. 2, 2020 to Non Final Office Action dated Jan. 2, 2020", 11 pgs.

"U.S. Appl. No. 15/965,764, Response filed May 24, 2021 to Non Final Office Action dated Feb. 22, 2021", 13 pgs.

"U.S. Appl. No. 15/965,764, Response filed Oct. 14, 2020 to Final Office Action dated May 14, 2020", 11 pgs.

"U.S. Appl. No. 15/965,764, Response filed Nov. 15, 2021 to Final Office Action dated Jun. 15, 2021", 12 pgs.

"U.S. Appl. No. 15/965,775, Corrected Notice of Allowability dated Apr. 7, 2022", 3 pgs.

"U.S. Appl. No. 15/965,775, Corrected Notice of Allowability dated Jun. 1, 2022", 3 pgs.

"U.S. Appl. No. 15/965,775, Corrected Notice of Allowability dated Jun. 15, 2022", 2 pgs.

"U.S. Appl. No. 15/965,775, Final Office Action dated Jan. 30, 2020", 10 pgs.

"U.S. Appl. No. 15/965,775, Final Office Action dated Jul. 6, 2021", 12 pgs.

"U.S. Appl. No. 15/965,775, Non Final Office Action dated Jun. 19, 2020", 12 pgs.

"U.S. Appl. No. 15/965,775, Non Final Office Action dated Jul. 29, 2019", 8 pgs.

"U.S. Appl. No. 15/965,775, Non Final Office Action dated Oct. 16, 2020", 11 pgs.

"U.S. Appl. No. 15/965,775, Notice of Allowance dated Feb. 22, 2022", 19 pgs.

"U.S. Appl. No. 15/965,775, Response filed Mar. 16, 2021 to Non Final Office Action dated Oct. 16, 2020", 10 pgs.

"U.S. Appl. No. 15/965,775, Response filed Jun. 1, 2020 to Final Office Action dated Jan. 30, 2020", 10 pgs.

"U.S. Appl. No. 15/965,775, Response filed Jul. 7, 2020 to Non Final Office Action dated Jun. 19, 2020", 9 pgs.

"U.S. Appl. No. 15/965,775, Response filed Oct. 6, 2021 to Final Office Action dated Jul. 6, 2021", 11 pgs.

"U.S. Appl. No. 15/965,775, Response filed Oct. 29, 2019 to Non Final Office Action dated Jul. 29, 2019", 10 pgs.

"U.S. Appl. No. 15/965,811, Final Office Action dated Feb. 12, 2020", 16 pgs.

"U.S. Appl. No. 15/965,811, Final Office Action dated Apr. 14, 2021", 19 pgs.

"U.S. Appl. No. 15/965,811, Non Final Office Action dated Jun. 26, 2020", 20 pgs.

"U.S. Appl. No. 15/965,811, Non Final Office Action dated Aug. 8, 2019", 15 pgs.

"U.S. Appl. No. 15/965,811, Non Final Office Action dated Oct. 4, 2021", 20 pgs.

"U.S. Appl. No. 15/965,811, Notice of Allowability dated Mar. 25, 2022", 10 pgs.

"U.S. Appl. No. 15/965,811, Notice of Allowability dated May 11, 2022", 2 pgs.

"U.S. Appl. No. 15/965,811, Notice of Allowability dated Jun. 17, 2022", 2 pgs.

"U.S. Appl. No. 15/965,811, Notice of Allowance dated Mar. 9, 2022", 9 pgs.

"U.S. Appl. No. 15/965,811, Response filed Feb. 4, 2022 to Non Final Office Action dated Oct. 4, 2021", 14 pgs.

(56) References Cited

OTHER PUBLICATIONS

"U.S. Appl. No. 15/965,811, Response filed Jun. 12, 2020 to Final Office Action dated Feb. 12, 2020", 13 pgs.
"U.S. Appl. No. 15/965,811, Response filed Sep. 14, 2021 to Final Office Action dated Apr. 14, 2021", 14 pgs.
"U.S. Appl. No. 15/965,811, Response filed Nov. 8, 2019 to Non Final Office Action dated Aug. 8, 2019", 14 pgs.
"U.S. Appl. No. 15/965,811, Response filed Dec. 28, 2020 to Non Final Office Action dated Jun. 26, 2020", 13 pgs.
"U.S. Appl. No. 16/115,259, Final Office Action dated Jul. 22, 2020", 20 pgs.
"U.S. Appl. No. 16/115,259, Final Office Action dated Dec. 16, 2019", 23 pgs.
"U.S. Appl. No. 16/115,259, Non Final Office Action dated Jan. 11, 2021", 17 pgs.
"U.S. Appl. No. 16/115,259, Non Final Office Action dated Apr. 9, 2020", 18 pgs.
"U.S. Appl. No. 16/115,259, Non Final Office Action dated Jul. 30, 2019", 21 pgs.
"U.S. Appl. No. 16/115,259, Preliminary Amendment filed Oct. 18, 2018 t", 6 pgs.
"U.S. Appl. No. 16/115,259, Response filed Mar. 13, 2020 to Final Office Action dated Dec. 16, 2019", 9 pgs.
"U.S. Appl. No. 16/115,259, Response filed Jul. 9, 2020 to Non Final Office Action dated Apr. 9, 2020", 8 pgs.
"U.S. Appl. No. 16/115,259, Response filed Oct. 22, 2020 to Final Office Action dated Jul. 22, 2020", 10 pgs.
"U.S. Appl. No. 16/115,259, Response filed Oct. 30, 2019 to Non Final Office Action dated Jul. 30, 2019", 9 pgs.
"U.S. Appl. No. 16/193,938, Preliminary Amendment filed Nov. 27, 2018", 7 pgs.
"U.S. Appl. No. 16/232,824, Examiner Interview Summary dated Jul. 24, 2020", 3 pgs.
"U.S. Appl. No. 16/232,824, Final Office Action dated Apr. 30, 2020", 19 pgs.
"U.S. Appl. No. 16/232,824, Final Office Action dated Jun. 23, 2022", 26 pgs.
"U.S. Appl. No. 16/232,824, Final Office Action dated Nov. 2, 2021", 25 pgs.
"U.S. Appl. No. 16/232,824, Non Final Office Action dated Feb. 19, 2021", 28 pgs.
"U.S. Appl. No. 16/232,824, Non Final Office Action dated Oct. 21, 2019", 18 pgs.
"U.S. Appl. No. 16/232,824, Response filled Feb. 21, 2020 to Non Final Office Action dated Oct. 21, 2019", 9 pgs.
"U.S. Appl. No. 16/232,824, Response filed May 2, 2022 to Final Office Action dated Nov. 2, 2021", 13 pgs.
"U.S. Appl. No. 16/232,824, Response filed Jul. 15, 2020 to Final Office Action dated Apr. 30, 2020", 11 pgs.
"U.S. Appl. No. 16/232,824, Response filed Aug. 19, 2021 to Non Final Office Action dated Feb. 19, 2021", 12 pgs.
"U.S. Appl. No. 16/245,660, Final Office Action dated Feb. 6, 2020", 12 pgs.
"U.S. Appl. No. 16/245,660, Non Final Office Action dated Jun. 27, 2019", 11 pgs.
"U.S. Appl. No. 16/245,660, Notice of Allowability dated Nov. 18, 2020", 2 pgs.
"U.S. Appl. No. 16/245,660, Notice of Allowance dated Jul. 8, 2020", 8 pgs.
"U.S. Appl. No. 16/245,660, Notice of Allowance dated Nov. 3, 2020", 8 pgs.
"U.S. Appl. No. 16/245,660, Response filed Jun. 8, 2020 to Final Office Action dated Feb. 6, 2020", 16 pgs.
"U.S. Appl. No. 16/245,660, Response filed Nov. 6, 2019 to Non Final Office Action dated Jun. 27, 2019", 11 pgs.
"U.S. Appl. No. 16/365,300, Examiner Interview Summary dated Nov. 29, 2021", 2 pgs.
"U.S. Appl. No. 16/365,300, Final Office Action dated Mar. 25, 2022", 29 pgs.
"U.S. Appl. No. 16/365,300, Final Office Action dated Apr. 15, 2021", 31 pgs.
"U.S. Appl. No. 16/365,300, Final Office Action dated May 13, 2020", 44 pgs.
"U.S. Appl. No. 16/365,300, Non Final Office Action dated Aug. 3, 2021", 29 pgs.
"U.S. Appl. No. 16/365,300, Non Final Office Action dated Sep. 28, 2020", 40 pgs.
"U.S. Appl. No. 16/365,300, Non Final Office Action dated Oct. 30, 2019", 40 pgs.
"U.S. Appl. No. 16/365,300, Response filed Jan. 28, 2021 to Non Final Office Action dated Sep. 28, 2020", 17 pgs.
"U.S. Appl. No. 16/365,300, Response filed Jan. 30, 2020 to Non Final Office Action dated Oct. 30, 2019", 16 pgs.
"U.S. Appl. No. 16/365,300, Response filed Jul. 15, 2021 to Final Office Action dated Apr. 15, 2021", 11 pgs.
"U.S. Appl. No. 16/365,300, Response filed Aug. 13, 2020 to Final Office Action dated May 13, 2020", 16 pgs.
"U.S. Appl. No. 16/365,300, Response filed Dec. 2, 2021 to Non Final Office Action dated Aug. 3, 2021", 10 pgs.
"U.S. Appl. No. 17/131,598, Preliminary Amendment filed Jun. 8, 2021", 10 pages.
"U.S. Appl. No. 17/248,841, Notice of Allowability dated Jul. 18, 2022", 2 pgs.
"U.S. Appl. No. 17/248,841, Notice of Allowance dated Apr. 7, 2022", 9 pgs.
"U.S. Appl. No. 17/248,841, Preliminary Amendment filed Apr. 22, 2021", 7 pgs.
"U.S. Appl. No. 17/249,201, Corrected Notice of Allowability dated Jun. 24, 2022", 2 pgs.
"U.S. Appl. No. 17/249,201, Non Final Office Action dated May 26, 2022", 5 pgs.
"U.S. Appl. No. 17/249,201, Notice of Allowance dated Jun. 9, 2022", 7 pgs.
"U.S. Appl. No. 17/249,201, Preliminary Amendment filed Oct. 6, 2021", 9 pgs.
"U.S. Appl. No. 17/249,201, Response filed May 27, 2022 to Non Final Office Action dated May 26, 2022", 10 pgs.
"BlogStomp", StompSoftware, [Online] Retrieved from the Internet: <URL: http://stompsoftware.com/blogstomp>, (accessed May 24, 2017), 12 pgs.
"Chinese Application Serial No. 202010079763.5, Office Action dated Apr. 12, 2022" W/English Translation, 14 pgs.
"Chinese Application Serial No. 202010079763.5, Office Action dated Aug. 27, 2021", w/ English Translation, 15 pgs.
"Chinese Application Serial No. 202010079763.5, Response Filed Jan. 11, 2022 to Office Action dated Aug. 27, 2021", w/ English Claims, 13 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.
"European Application Serial No. 19206595.1, Extended European Search Report dated Mar. 31, 2020", 6 pgs.
"European Application Serial No. 17776809.0, Extended European Search Report dated Feb. 27, 2019", 7 pgs.
"European Application Serial No. 18789872.1, Communication Pursuant to Article 94(3) EPC dated Aug. 11, 2020", 6 pgs.
"European Application Serial No. 18789872.1, Extended European Search Report dated Jan. 2, 2020", 8 pgs.
"European Application Serial No. 18789872.1, Response filed Feb. 18, 2021 to Communication Pursuant to Article 94(3) EPC dated Aug. 11, 2020", 15 pgs.
"European Application Serial No. 18789872.1, Summons to Attend Oral Proceedings mailed Jun. 23, 2021", 9 pgs.
"European Application Serial No. 18789872.1, Summons to Attend Oral Proceedings mailed Sep. 13, 2021", 9 pgs.
"European Application Serial No. 18790189.7, Communication Pursuant to Article 94(3) EPC dated Jul. 30, 2020", 9 pgs.

(56) References Cited

OTHER PUBLICATIONS

"European Application Serial No. 18790189.7, Extended European Search Report dated Jan. 2, 2020", 7 pgs.
"European Application Serial No. 18790189.7, Response filed Feb. 9, 2021 to Communication Pursuant to Article 94(3) EPC dated Jul. 30, 2020", 11 pgs.
"European Application Serial No. 18790189.7, Response Filed Jul. 14, 2020 to Extended European Search Report dated Jan. 2, 2020", 21 pgs.
"European Application Serial No. 18790189.7, Summons to attend oral proceedings mailed Jul. 8, 2021", 13 pgs.
"European Application Serial No. 18790319.0, Communication Pursuant to Article 94(3) EPC dated Jul. 21, 2021", 7 pgs.
"European Application Serial No. 18790319.0, Extended European Search Report dated Feb. 12, 2020", 6 pgs.
"European Application Serial No. 18790319.0, Response Filed Jan. 28, 2022 to Communication Pursuant to Article 94(3) EPC dated Jul. 21, 2021", 16 pgs.
"European Application Serial No. 18790319.0, Response filed Aug. 27, 2020 to Extended European Search Report dated Feb. 12, 2020", 19 pgs.
"European Application Serial No. 18791363.7, Communication Pursuant to Article 94(3) EPC dated Aug. 11, 2020", 9 pgs.
"European Application Serial No. 18791363.7, Extended European Search Report dated Jan. 2, 2020", 8 pgs.
"European Application Serial No. 18791363.7, Response filed Jul. 14, 2020 to Extended European Search Report dated Jan. 2, 2020", 31 pgs.
"European Application Serial No. 18791363.7,Response Filed Feb. 22, 2021 to Communication Pursuant to Article 94(3) EPC dated Aug. 11, 2020", 35 pgs.
"European Application Serial No. 18791925.3, Communication Pursuant to Article 94(3) EPC dated May 11, 2021", 7 pgs.
"European Application Serial No. 18791925.3, Extended European Search Report dated Jan. 2, 2020", 6 pgs.
"European Application Serial No. 18791925.3, Response Filed Jul. 27, 2020 to Extended European Search Report dated Jan. 2, 2020", 19 pgs.
"European Application Serial No. 19206595.1, Communication Pursuant to Article 94(3) EPC dated Jul. 22, 2021", 7 pgs.
"European Application Serial No. 19206595.1, Response filed Jan. 28, 2022 to Communication Pursuant to Article 94(3) EPC dated Jul. 22, 2021", 18 pgs.
"European Application Serial No. 19206595.1, Response filed Dec. 16, 2020 to Extended European Search Report dated Mar. 31, 2020", 43 pgs.
"European Application Serial No. 19206610.8, Communication Pursuant to Article 94(3) EPC dated Jul. 21, 2021", 8 pgs.
"European Application Serial No. 19206610.8, Extended European Search Report dated Feb. 12, 2020", 6 pgs.
"European Application Serial No. 19206610.8, Response filed Jan. 26, 2022 to Communication Pursuant to Article 94(3) EPC dated Jul. 21, 2021", 23 pgs.
"European Application Serial No. 19206610.8, Response filed Sep. 23, 2020 to Extended European Search Report dated Feb. 12, 2020", 109 pgs.
"InstaPlace Photo App Tell The Whole Story", [Online] Retrieved from the Internet: <URL: youtu.be/uF_gFkg1hBM>, (Nov. 8, 2013), 113 pgs., 1:02 min.
"International Application Serial No. PCT/CA2013/000454, International Preliminary Report on Patentability dated Nov. 20, 2014", 9 pgs.
"International Application Serial No. PCT/CA2013/000454, International Search Report dated Aug. 20, 2013", 3 pgs.
"International Application Serial No. PCT/CA2013/000454, Written Opinion dated Aug. 20, 2013", 7 pgs.
"International Application Serial No. PCT/US2015/037251, International Search Report dated Sep. 29, 2015", 2 pgs.
"International Application Serial No. PCT/US2017/025460, International Preliminary Report on Patentability dated Oct. 11, 2018", 9 pgs.
"International Application Serial No. PCT/US2017/025460, International Search Report dated Jun. 20, 2017", 2 pgs.
"International Application Serial No. PCT/US2017/025460, Written Opinion dated Jun. 20, 2017", 7 pgs.
"International Application Serial No. PCT/US2017/040447, International Preliminary Report on Patentability dated Jan. 10, 2019", 8 pgs.
"International Application Serial No. PCT/US2017/040447, International Search Report dated Oct. 2, 2017", 4 pgs.
"International Application Serial No. PCT/US2017/040447, Written Opinion dated Oct. 2, 2017", 6 pgs.
"International Application Serial No. PCT/US2017/057918, International Search Report dated Jan. 19, 2018", 3 pgs.
"International Application Serial No. PCT/US2017/057918, Written Opinion dated Jan. 19, 2018", 7 pgs.
"International Application Serial No. PCT/US2017/063981, International Search Report dated Mar. 22, 2018", 3 pgs.
"International Application Serial No. PCT/US2017/063981, Written Opinion dated Mar. 22, 2018", 8 pgs.
"International Application Serial No. PCT/US2018/000112, International Preliminary Report on Patentability dated Nov. 7, 2019", 6 pgs.
"International Application Serial No. PCT/US2018/000112, International Search Report dated Jul. 20, 2018", 2 pgs.
"International Application Serial No. PCT/US2018/000112, Written Opinion dated Jul. 20, 2018", 4 pgs.
"International Application Serial No. PCT/US2018/000113, International Preliminary Report on Patentability dated Nov. 7, 2019", 6 pgs.
"International Application Serial No. PCT/US2018/000113, International Search Report dated Jul. 13, 2018", 2 pgs.
"International Application Serial No. PCT/US2018/000113, Written Opinion dated Jul. 13, 2018", 4 pgs.
"International Application Serial No. PCT/US2018/030039, International Preliminary Report on Patentability dated Nov. 7, 2019", 6 pgs.
"International Application Serial No. PCT/US2018/030039, International Search Report dated Jul. 11, 2018", 2 pgs.
"International Application Serial No. PCT/US2018/030039, Written Opinion dated Jul. 11, 2018", 4 pgs.
"International Application Serial No. PCT/US2018/030041, International Preliminary Report on Patentability dated Nov. 7, 2019", 5 pgs.
"International Application Serial No. PCT/US2018/030041, International Search Report dated Jul. 11, 2018", 2 pgs.
"International Application Serial No. PCT/US2018/030041, Written Opinion dated Jul. 11, 2018", 3 pgs.
"International Application Serial No. PCT/US2018/030043, International Preliminary Report on Patentability dated Nov. 7, 2019", 7 pgs.
"International Application Serial No. PCT/US2018/030043, International Search Report dated Jul. 23, 2018", 2 pgs.
"International Application Serial No. PCT/US2018/030043, Written Opinion dated Jul. 23, 2018", 5 pgs.
"International Application Serial No. PCT/US2018/030044, International Preliminary Report on Patentability dated Nov. 7, 2019", 8 pgs.
"International Application Serial No. PCT/US2018/030044, International Search Report dated Jun. 26, 2018", 2 pgs.
"International Application Serial No. PCT/US2018/030044, Written Opinion dated Jun. 26, 2018", 6 pgs.
"International Application Serial No. PCT/US2018/030045, International Preliminary Report on Patentability dated Nov. 7, 2019", 8 pgs.
"International Application Serial No. PCT/US2018/030045, International Search Report dated Jul. 3, 2018", 2 pgs.
"International Application Serial No. PCT/US2018/030045, Written Opinion dated Jul. 3, 2018", 6 pgs.

(56) References Cited

OTHER PUBLICATIONS

"International Application Serial No. PCT/US2018/030046, International Preliminary Report on Patentability dated Nov. 7, 2019", 8 pgs.
"International Application Serial No. PCT/US2018/030046, International Search Report dated Jul. 6, 2018", 2 pgs.
"International Application Serial No. PCT/US2018/030046, Written Opinion dated Jul. 6, 2018", 6 pgs.
"Introducing Google Latitude", Google UK, [Online] Retrieved from the Internet: <URL: https://www.youtube.com/watch?v=XecGMKqiA5A>, [Retrieved on: Oct. 23, 2019], (Feb. 3, 2009), 1 pg.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Korean Application Serial No. 10-2019-7034512, Notice of Preliminary Rejection dated May 17, 2021", With English translation, 15 pgs.
"Korean Application Serial No. 10-2019-7034512, Notice of Preliminary Rejection dated Nov. 2, 2021", w/ English translation, 8 pgs.
"Korean Application Serial No. 10-2019-7034512, Response Filed Jan. 3, 2022 to Notice of Preliminary Rejection dated Nov. 2, 2021", w/ English Claims, 18 pgs.
"Korean Application Serial No. 10-2019-7034596, Notice of Preliminary Rejection dated Mar. 7, 2022", w/ English translation, 21 pgs.
"Korean Application Serial No. 10-2019-7034596, Notice of Preliminary Rejection dated May 18, 2021", With English translation, 20 pgs.
"Korean Application Serial No. 10-2019-7034598, Notice of Preliminary Rejection dated Jan. 10, 2022", w/ English translation, 13 pgs.
"Korean Application Serial No. 10-2019-7034598, Notice of Preliminary Rejection dated Jun. 3, 2021", With English translation, 10 pgs.
"Korean Application Serial No. 10-2019-7034598, Response filed Sep. 3, 2021 to Notice of Preliminary Rejection dated Jun. 3, 2021", w/ English Claims, 27 pgs.
"Korean Application Serial No. 10-2019-7034598, Response Filed Mar. 10, 2022 to Notice of Preliminary Rejection dated Jan. 10, 2022", W/ English Claims, 24 pgs.
"Korean Application Serial No. 10-2019-7034715, Final Office Action dated Mar. 7, 2022", w/ English translation, 9 pgs.
"Korean Application Serial No. 10-2019-7034715, Notice of Preliminary Rejection dated May 21, 2021", With English translation, 15 pgs.
"Korean Application Serial No. 10-2019-7034751, Final Office Action dated Mar. 7, 2022", w/ English translation, 11 pgs.
"Korean Application Serial No. 10-2019-7034751, Notice of Preliminary Rejection dated May 21, 2021", With English translation, 18 pgs.
"Korean Application Serial No. 10-2019-7034899, Final Office Action dated Dec. 3, 2021", w/ English translation, 10 pgs.
"Korean Application Serial No. 10-2019-7034899, Notice of Preliminary Rejection dated May 27, 2021", With English translation, 17 pgs.
"Korean Application Serial No. 10-2019-7034899, Response filed Aug. 11, 2021 to Notice of Preliminary Rejection dated May 27, 2021", With English claims, 26 pgs.
"Korean Application Serial No. 10-2019-7035443, Notice of Preliminary Rejection dated Apr. 11, 2022", w/ English translation, 8 pgs.
"Korean Application Serial No. 10-2019-7035443, Notice of Preliminary Rejection dated May 26, 2021", w/ English translation, 14 pgs.
"Korean Application Serial No. 10-2019-7034899, Office Action dated Jan. 24, 2022", w/ English Translation, 12 pgs.
"Korean Application Serial No. 10-2019-7034899, Response filed Jan. 5, 2022 to Office Action dated Dec. 3, 2021", w/ English Translation of Claims, 12 pgs.
"List of IBM Patents or Patent Applications Treated as Related; (Appendix P)", IBM, (Sep. 14, 2018), 2 pgs.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Starbucks Cup Magic", [Online] Retrieved from the Internet: <URL: https://www.youtube.com/watch?v=RWwQXI9RG0w>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
"The One Million Tweet Map: Using Maptimize to Visualize Tweets in a World Map | PowerPoint Presentation", fppt.com, [Online] Retrieved form the Internet: <URL: https://web.archive.org/web/20121103231906/http://www.freepower-point-templates.com/articles/the-one-million-tweet-mapusing-maptimize-to-visualize-tweets-in-a-world-map/>, (Nov. 3, 2012), 6 pgs.
Birchall, Andrew Alexander, "The delivery of notifications that user perceives,", IP.com English Translation of CN 107210948 A Filed Dec. 16, 2014, (2014), 28 pgs.
Broderick, Ryan, "Every thing You Need to Know About Japan's Amazing Photo Booths", [Online] Retrieved from the Internet: <URL: https://www.buzzfeed.com/ryanhatesthis/look-how-kawaii-i-am?utm_term=.kra5QwGNZ#.muYoVB7qJ>, (Jan. 22, 2016), 30 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Castelluccia, Claude, et al., "EphPub: Toward robust Ephemeral Publishing", 19th IEEE International Conference on Network Protocols (ICNP), (Oct. 17, 2011), 18 pgs.
Chan, Connie, "The Elements of Stickers", [Online] Retrieved from the Internet: <URL: https://a16z.com/2016/06/17/stickers/>, (Jun. 20, 2016), 15 pgs.
Collet, Jean Luc, et al., "Interactive avatar in messaging environment", U.S. Appl. No. 12/471,811, filed May 26, 2009, (May 26, 2009), 31 pgs.
Dillet, Romain, "Zenly proves that location sharing isn't dead", [Online] Retrieved from the Internet: <URL: https://techcrunch.com/2016/05/19/zenly-solomoyolo/>, (accessed Jun. 27, 2018), 6 pgs.
Fajman, "An Extensible Message Format for Message Disposition Notifications", Request for Comments: 2298, National Institutes of Health, (Mar. 1998), 28 pgs.
Finn, Greg, "Miss Google Latitude? Google Plus With Location Sharing Is Now A Suitable Alternative", Cypress North, [Online] Retrieved from the Internet: <URL: https://cypressnorth.com/social-media/miss-google-latitude-google-location-sharing-now-suitable-alternative/>, [Retrieved on: Oct. 24, 2019], (Nov. 27, 2013), 10 pgs.
Gundersen, Eric, "Foursquare Switches to MapBox Streets, Joins the OpenStreetMap Movement", [Online] Retrieved from the Internet: <URL: https://blog.mapbox.com/foursquare-switches-to-mapbox-streets-joins-the-openstreetmap-movement-29e6a17f4464> (Mar. 6, 2012), 4 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

(56) References Cited

OTHER PUBLICATIONS

Lapenna, Joe, "The Official Google Blog. Check in with Google Latitude", Google Blog, [Online] Retrieved from the Internet: <https://web.archive.org/web/20110201201006/https://googleblog.blogspot.com/2011/02/check-in-with-google-latitude.html>, [Retrieved on: Oct. 23, 2019], (Feb. 1, 2011), 6 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

MacLeod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

MacLeod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Neis, Pascal, "The OpenStreetMap Contributors Map aka Who's around me?", [Online] Retrieved from the Internet by the examiner on Jun. 5, 2019: <URL: https://neis-one.org/2013/01/oooc/>, (Jan. 6, 2013), 7 pgs.

Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Perez, Sarah, "Life 360, The Family Locator With More Users Than Foursquare, Raises A $10 Million Series B", [Online] Retrieved from the Internet: <URL: https://techcrunch.com/2013/07/10/life360-the-family-locator-with-more-users-than-foursquare-raises-10-million-series-b/>, (Jul. 10, 2013), 2 pgs.

Petovello, Mark, "How does a GNSS receiver estimate velocity?", InsideGNSS, [Online] Retrieved from the Internet: <URL: http://insidegnss.com/wp-content/uploads/2018/01/marapr15-SOLUTIONS.pdf>., (Mar.-Apr. 2015), 3 pgs.

Rhee, Chi-Hyoung, et al., "Cartoon-like Avatar Generation Using Facial Component Matching", International Journal of Multimedia and Ubiquitous Engineering, (Jul. 30, 2013), 69-78.

Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Sulleyman, Aatif, "Google Maps Could Let Strangers Track Your Real-Time Location For Days At A Time", The Independent, [Online] Retrieved from the Internet: <URL: https://www.independent.co.uk/life-style/gadgets-and-tech/news/google-maps-track-location-real-time-days-privacy-security-stalk-gps-days-a7645721.html>, (Mar. 23, 2017), 5 pgs.

Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.

Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.

Wilmott, Clancy, et al., "Playful Mapping in the Digital Age", Playful Mapping Collective, Institute of Network Cultures, Amsterdam, (2016), 158 pgs.

Zibreg, "How to share your real time location on Google Maps", idownloadblog.com, [Online] Retrieved from the Internet: <URL: https://www.idownloadblog.com/2017/04/12/how-to-share-location-google-maps/>, [Retrieved on: Oct. 23, 2019], (Apr. 12, 2017), 23 pgs.

"U.S. Appl. No. 15/628,408, Examiner Interview Summary dated Jul. 27, 2022", 2 pgs.

"U.S. Appl. No. 15/628,408, Non Final Office Action dated Dec. 27, 2022", 36 pgs.

"U.S. Appl. No. 15/628,408, Response filed Apr. 27, 2023 to Non Final Office Action dated Dec. 27, 2022", 13 pgs.

"U.S. Appl. No. 15/628,408, Response filed Aug. 10, 2022 to Final Office Action dated Jun. 10, 2022", 14 pgs.

"U.S. Appl. No. 15/965,466, 312 Amendment filed Dec. 2, 2022", 11 pgs.

"U.S. Appl. No. 15/965,466, Corrected Notice of Allowability dated Oct. 26, 2022", 3 pgs.

"U.S. Appl. No. 15/965,466, Corrected Notice of Allowability dated Dec. 14, 2022", 3 pgs.

"U.S. Appl. No. 15/965,466, Notice of Allowance dated Sep. 2, 2022", 10 pgs.

"U.S. Appl. No. 15/965,466, PTO Response to Rule 312 Communication dated Dec. 14, 2022", 12 pgs.

"U.S. Appl. No. 15/965,744, Final Office Action dated Oct. 21, 2022", 31 pgs.

"U.S. Appl. No. 15/965,744, Non Final Office Action dated Mar. 30, 2023", 34 pgs.

"U.S. Appl. No. 15/965,744, Response filed Feb. 21, 2023 to Final Office Action dated Oct. 21, 2022", 14 pgs.

"U.S. Appl. No. 15/965,744, Response filed Jul. 5, 2022 to Non Final Office Action dated Mar. 4, 2022", 13 pgs.

"U.S. Appl. No. 15/965,756, Final Office Action dated May 12, 2023", 18 pgs.

"U.S. Appl. No. 15/965,756, Non Final Office Action dated Nov. 14, 2022", 16 pgs.

"U.S. Appl. No. 15/965,756, Response filed Feb. 14, 2023 to Non Final Office Action dated Nov. 14, 2022", 13 pgs.

"U.S. Appl. No. 15/965,756, Response filed Aug. 1, 2022 to Non Final Office Action dated Mar. 31, 2022", 12 pgs.

"U.S. Appl. No. 15/965,764, PTO Response to Rule 312 Communication mailed Aug. 16, 2022", 2 pgs.

"U.S. Appl. No. 15/965,811, PTO Response to Rule 312 Communication mailed Jul. 12, 2022", 2 pgs.

"U.S. Appl. No. 16/115,259, Final Office Action dated Apr. 4, 2022", 18 pgs.

"U.S. Appl. No. 16/115,259, Final Office Action dated Jul. 13, 2021", 18 pgs.

"U.S. Appl. No. 16/115,259, Non Final Office Action dated Nov. 8, 2021", 17 pgs.

"U.S. Appl. No. 16/115,259, Response filed Feb. 8, 2022 to Non Final Office Action dated Nov. 8, 2021", 9 pgs.

"U.S. Appl. No. 16/115,259, Response filed May 11, 2021 to Non Final Office Action dated Jan. 11, 2021", 14 pgs.

"U.S. Appl. No. 16/115,259, Response filed Oct. 13, 2021 to Final Office Action dated Jul. 13, 2021", 10 pgs.

"U.S. Appl. No. 16/232,824, Non Final Office Action dated Mar. 30, 2023", 27 pgs.

"U.S. Appl. No. 16/232,824, Response filed Nov. 22, 2022 to Final Office Action dated Jun. 23, 2022", 12 pgs.

"U.S. Appl. No. 16/365,300, Advisory Action dated Mar. 9, 2023", 3 pgs.

"U.S. Appl. No. 16/365,300, Examiner Interview Summary dated Jul. 29, 2022", 2 pgs.

"U.S. Appl. No. 16/365,300, Final Office Action dated Dec. 30, 2022", 31 pgs.

"U.S. Appl. No. 16/365,300, Non Final Office Ation dated Aug. 18, 2022", 31 pgs.

"U.S. Appl. No. 16/365,300, Notice of Allowane dated Jul. 17, 2023", 19 pgs.

"U.S. Appl. No. 16/365,300, Response filed Feb. 28, 2023 to Final Office Action dated Dec. 30, 2022", 3 pgs.

"U.S. Appl. No. 16/365,300, Response filed May 1, 2023 to Advisory Action dated Mar. 9, 2023", 13 pgs.

(56) References Cited

OTHER PUBLICATIONS

"U.S. Appl. No. 16/365,300, Response filed Jul. 25, 2022 to Final Office Action dated Mar. 25, 2022", 13 pgs.
"U.S. Appl. No. 16/365,300, Response filed Dec. 19, 2022 to Non Final Office Action dated Aug. 18, 2022", 11 pgs.
"U.S. Appl. No. 17/131,598, Final Office Action dated May 11, 2023", 26 pgs.
"U.S. Appl. No. 17/131,598, Non Final Office Action dated Sep. 27, 2022", 27 pgs.
"U.S. Appl. No. 17/131,598, Response filed Jan. 27, 2023 to Non Final Office Action dated Sep. 27, 2022", 15 pgs.
"U.S. Appl. No. 17/131,598, Response filed Jul. 18, 2023 to Final Office Action dated May 11, 2023", 16 pgs.
"U.S. Appl. No. 17/249,201, Corrected Notice of Allowability dated Sep. 22, 2022", 2 pgs.
"U.S. Appl. No. 17/314,963, Final Office Action dated Jul. 11, 2022", 25 pgs.
"U.S. Appl. No. 17/314,963, Non Final Office Action dated Feb. 2, 2022", 24 pgs.
"U.S. Appl. No. 17/314,963, Response filed May 2, 2022 to Non Final Office Action dated Feb. 2, 2022", 10 pgs.
"U.S. Appl. No. 17/804,771, Examiner Interview Summary dated Apr. 11, 2023", 2 pgs.
"U.S. Appl. No. 17/804,771, Non Final Office Action dated Mar. 17, 2023", 20 pgs.
"U.S. Appl. No. 17/804,771, Response filed Jun. 20, 2023 to Non Final Office Action dated Mar. 17, 2023", 14 pgs.
"U.S. Appl. No. 17/805,127, Non Final Office Action dated Apr. 27, 2023", 98 pgs.
"U.S. Appl. No. 17/805,127, Preliminary Amendment Filed Nov. 8, 2022", 10 pgs.
"U.S. Appl. No. 17/879,607, Notice of Allowability dated Jun. 12, 2023", 2 pgs.
"U.S. Appl. No. 17/879,607, Notice of Allowance dated Mar. 6, 2023", 10 pgs.
"U.S. Appl. No. 17/879,607, Preliminary Amendment filed Oct. 19, 2022", 9 pgs.
"U.S. Appl. No. 17/946,337, Preliminary Amendment Filed Oct. 31, 2022", 7 pgs.
"U.S. Appl. No. 18/047,213, Preliminary Amendment filed Oct. 31, 2022", 2 pgs.
"Chinese Application Serial No. 201880042674.4, Office Action dated Feb. 20, 2023", w/ English Translation, 13 pgs.
"Chinese Application Serial No. 201880043068.4, Office Action dated Mar. 1, 2023", w/ English Translation, 22 pgs.
"Chinese Application Serial No. 201880043121.0, Office Action dated Feb. 20, 2023", w/ English Translation, 12 pgs.
"Chinese Application Serial No. 201880043144.1, Office Action dated Feb. 17, 2023", w/ English Translation, 12 pgs.
"Chinese Application Serial No. 201880043199.2, Office Action dated Mar. 31, 2023", w/ English Translation, 12 pgs.
"Chinese Application Serial No. 202010079763.5, Response filed Jun. 1, 2022 to Office Action dated Apr. 12, 2022", w/ English Claims, 12 pgs.
"Chinese Application Serial No. 202010086283.1, Office Action dated Mar. 16, 2023", w/ English Translation, 12 pgs.
"European Application Serial No. 18791363.7, Response filed Aug. 5, 2022 to Summons to attend oral proceedings mailed Apr. 4, 2022", 10 pgs.
"European Application Serial No. 18791363.7, Summons to attend oral proceedings mailed Apr. 4, 2022", 11 pgs.
"European Application Serial No. 22165083.1, Extended European Search Report dated Jul. 12, 2022", 7 pgs.
"European Application Serial No. 22173072.4, Extended European Search Report dated Aug. 26, 2022", 6 pgs.
"Korean Application Serial No. 10-2019-7034715, Office Action dated Jan. 30, 2023", w/ English machine translation, 3 pgs.
"Korean Application Serial No. 10-2019-7034715, Office Action dated Feb. 27, 2023", w/ English Machine Translation, 46 pgs.
"Korean Application Serial No. 10-2019-7034715, Office Action dated Jun. 27, 2022", w/ English Translation, 7 pgs.
"Korean Application Serial No. 10-2019-7034715, Response filed Nov. 22, 2021 to Office Action dated May 21, 2021", w/ English Claims, 22 pgs.
"Korean Application Serial No. 10-2019-7034751, Response filed Jun. 7, 2022 to Office Action dated Mar. 7, 2022", w/ English Claims, 27 pgs.
"Korean Application Serial No. 10-2019-7035443, Response filed May 6, 2022 to Office Action dated Apr. 12, 2022", w/ English Claims, 17 pgs.
"Korean Application Serial No. 10-2022-7013956, Notice of Preliminary Rejection dated Jan. 13, 2023", w/ English Translation, 22 pgs.
"Korean Application Serial No. 10-2022-7028257, Notice of Preliminary Rejection dated Apr. 5, 2023", w/ English Translation, 6 pgs.
"Korean Application Serial No. 10-2022-7033556, Notice of Preliminary Rejection dated Jun. 8, 2023", w/ English Translation, 13 pgs.
"Korean Application Serial No. 10-2022-7033840, Notice of Preliminary Rejection dated Jun. 9, 2023", w/ English Translation, 20 pgs.
"Korean Application Serial No. 10-2022-7035335, Notice of Preliminary Rejection dated Jun. 7, 2023", w/ English Translation, 24 pgs.
"Korean Application Serial No. 10-2019-7034596, Response filed Sep. 7, 2022 to Office Action filed Mar. 7, 2022", w/ English Claims, 30 pgs.
"Korean Application Serial No. 10-2019-7034596, Response filed Nov. 18, 2021 to Office Action dated May 18, 2021", w/ English Claims, 23 pgs.
"Korean Application Serial No. 10-2019-7034715, Response filed Jun. 7, 2022 to Office Action dated Mar. 7, 2022", w/ English Claims, 18 pgs.
"Korean Application Serial No. 10-2019-7034751, Response filed Nov. 22, 2021 to Office Action dated May 21, 2021", w/ English Claims, 28 pgs.
"Tiled web map—Wikipedia", <URL:https://en.wikipedia.org/w/index.php?title=Tiled_web_map&oldid=758691778>, (Jan. 6, 2017), 1-3.
"What is interpolation?", CUNY, [Online] Retrieved from the internet: <http://www.geography.hunter.cuny.edu/~jochen/gtech361/lectures/lecture11/concepts/What%20is%20interpolation.htm>, (May 8, 2016), 2 pgs.
Dempsey, C, "What is the difference between a heat map and a hot spot map?", [Online] Retrieved from the internet: <https://www.gislounge.com/difference-heat-map-hot-spot-map/>, (Aug. 10, 2014), 8 pgs.
Grubert, "Towards pervasive augmented reality context awareness in Augmented reality", (2017), 20 pgs.
Seokyeon, Kim, et al., "The visualization of spatial temporal data using the gravity model", information science society paper electuary 43 Keown second call, Journal of KIISE, vol. 43, No. 2, (Feb. 2016), 8 pgs.
"U.S. Appl. No. 15/628,408, Corrected Notice of Allowability dated Nov. 15, 2023", 2 pgs.
"U.S. Appl. No. 15/628,408, Corrected Notice of Allowability dated Nov. 24, 2023", 2 pgs.
"U.S. Appl. No. 15/965,744, Final Office Action dated Oct. 24, 2023", 35 pgs.
"U.S. Appl. No. 16/232,824, Final Office Action dated Oct. 25, 2023", 27 pgs.
"U.S. Appl. No. 16/365,300, Notice of Allowability dated Nov. 6, 2023", 3 pgs.
"U.S. Appl. No. 17/131,598, Non Final Office Action dated Dec. 26, 2023", 29 pgs.
"U.S. Appl. No. 17/804,771, Final Office Action dated Aug. 7, 2023", 21 pgs.
"U.S. Appl. No. 17/805,127, Notice of Allowance dated Oct. 24, 2023", 20 pgs.
"U.S. Appl. No. 17/879,607, Notice of Allowability dated Aug. 14, 2023", 2 pgs.

(56) References Cited

OTHER PUBLICATIONS

"U.S. Appl. No. 17/946,337, Non Final Office Action dated Nov. 20, 2023", 19 pgs.
"U.S. Appl. No. 18/047,213, Notice of Allowance dated Jan. 11, 2024", 8 pgs.
"U.S. Appl. No. 18/047,213, Response filed Dec. 13, 2023 to Non Final Office Action dated Sep. 13, 2023", 14 pgs.
"U.S. Appl. No. 18/078,268, Non Final Office Action dated Dec. 15, 2023", 21 pgs.
"U.S. Appl. No. 18/196,915, Non Final Office Action dated Dec. 21, 2023", 16 pgs.
"Chinese Application Serial No. 201880042674.4, Office Action dated Dec. 21, 2023", w/ English Translation, 10 pgs.
"Chinese Application Serial No. 201880043144.1, Office Action dated Nov. 28, 2023", w/ English Translation, 9 pgs.
"Chinese Application Serial No. 201880043144.1, Response filed Apr. 22, 2023 to Office Action dated Feb. 17, 2023", With English claims, 13 pgs.
"Chinese Application Serial No. 202010086283.1, Office Action dated Oct. 28, 2023", w/ English Translation, 5 pgs.
"Chinese Application Serial No. 202010086283.1, Response filed Dec. 13, 2023 to Office Action dated Oct. 28, 2023", w/ English claims, 12 pgs.
"European Application Serial No. 18791363.7, EPO Written Decision to Refuse dated Aug. 16, 2023", 17 pgs.
"Korean Application Serial No. 10-2022-7033556, Notice of Preliminary Rejection dated Dec. 8, 2023", w/ English Translation, 16 pgs.
"Korean Application Serial No. 10-2022-7035335, Response filed Nov. 7, 2023 to Notice of Preliminary Rejection dated Jun. 7, 2023", W/English Claims, 26 pgs.
"Korean Application Serial No. 10-2023-7010121, Notice of Preliminary Rejection dated Oct. 19, 2023", w/ English Translation, 12 pgs.
U.S. Appl. No. 18/649,372, filed Apr. 29, 2024, Map-Based Graphic User Interface for Multi-Type Social Media Galleries.
U.S. Appl. No. 18/667,050, filed May 17, 2024, Location-Based Search Mechanism in a Graphical User Interface.
"European Application Serial No. 23203327.4, Extended European Search Report mailed Mar. 5, 2024", 10 pgs.
"Chinese Application Serial No. 201880043144.1, Decision of Rejection mailed Feb. 21, 2024", w/ English Translation, 11 pgs.
"Korean Application Serial No. 10-2022-7013956, Notice of Preliminary Rejection mailed Mar. 14, 2024", w/ English translation, 7 pgs.
"Chinese Application Serial No. 201880042674.4, Decision of Rejection mailed Mar. 12, 2024", w/ English Translation, 10 pgs.
"Chinese Application Serial No. 201880043121.0, Decision of Rejection mailed Mar. 12, 2024", w/ English Translation, 12 pgs.
Fan, Zhang, "Research on Heatmap for Big Data Based on Spark", Journal of Computer-Aided Design and Computer Graphics vol. 28 No 11—English abstract included, (Nov. 2016), 6 pgs.
Jiayao, Hu, "Self Presentation In Location Based Social Networks", New Media and Society—English abstract included. (Nov. 2015), 14 pgs.
"European Application Serial No. 19206595.1, Response filed Feb. 20, 2024 to Communication Pursuant to Article 94(3) EPC mailed Aug. 29, 2023", 19 pgs.

"U.S. Appl. No. 15/965,744, Response filed Feb. 26, 2024 to Final Office Action mailed Oct. 24, 2023", 12 pgs.
"U.S. Appl. No. 16/232,824, Response filed Feb. 26, 2024 to Final Office Action mailed Oct. 25, 2023", 12 pgs.
"Chinese Application Serial No. 201880043199.2, Response filed Feb. 28, 2024 to Office Action mailed Dec. 18, 2023", w/ English Claims, 12 pgs.
"Chinese Application Serial No. 201880043121.0, Response filed Mar. 5, 2024 to Office Action mailed Dec. 21, 2023", w/ English Claims, 15 pgs.
"Chinese Application Serial No. 201880042674.4, Response filed Mar. 5, 2024 to Office Action mailed Dec. 21, 2023", w/ English Machine Translation, 10 pgs.
"Korean Application Serial No. 10-2023-7000455, Response filed Mar. 8, 2024 to Notice of Preliminary Rejection mailed Sep. 11, 2023", w/ current English claims, 21 pgs.
"U.S. Appl. No. 18/196,915, Response filed Mar. 21, 2024 to Non Final Office Action mailed Dec. 21, 2023", 10 pgs.
"U.S. Appl. No. 18/047,213, Corrected Notice of Allowability mailed Mar. 25, 2024", 2 pgs.
"Korean Application Serial No. 10-2023-7010121, Response filed Mar. 19, 2024 to Notice of Preliminary Rejection mailed Oct. 19, 2023", w/ current English claims, 24 pgs.
"Chinese Application Serial No. 202010086283.1, Response filed Mar. 21, 2024 to Office Action mailed Jan. 15, 2024", w/ current English claims, 14 pgs.
"U.S. Appl. No. 17/131,598, Response filed Mar. 26, 2024 to Non Final Office Action mailed Dec. 26, 2023", 13 pgs.
"U.S. Appl. No. 15/965,744, Non Final Office Action mailed Mar. 27, 2024", 35 pgs.
"U.S. Appl. No. 18/047,213, Amendment Under 37 CFR 1.312 Filed Apr. 10, 2024", 9 pgs.
"U.S. Appl. No. 17/131,598, Final Office Action mailed Apr. 10, 2024", 30 pgs.
"U.S. Appl. No. 16/232,824, Non Final Office Action mailed Apr. 10, 2024", 28 pgs.
"How to combine several images into one document using GIMP", Useful Graphic Design Tutorials, [Online]. Retrieved from the Internet: <https://www.youtube.com/watch?v=-h4Lu7Agbw0>, (Jan. 6, 2013), 2 pgs.
"U.S. Appl. No. 18/047,213, 312 Amendment filed Apr. 10, 2024", 9 pgs.
"U.S. Appl. No. 18/196,915, Notice of Allowance mailed Apr. 18, 2024", 10 pgs.
"U.S. Appl. No. 17/946,337, Response filed Apr. 22, 2024 to Non Final Office Action mailed Nov. 20, 2023", 15 pgs.
"U.S. Appl. No. 18/047,213, PTO Response to Rule 312 Communication mailed Apr. 24, 2024", 3 pgs.
"U.S. Appl. No. 15/965,756, Response filed Apr. 29, 2024 to Non Final Office Action mailed Jan. 31, 2024", 14 pgs.
"U.S. Appl. No. 17/805,127, Supplemental Notice of Allowability mailed May 1, 2024", 3 pgs.
"U.S. Appl. No. 18/196,915, Notice of Allowability mailed May 6, 2024", 2 pgs.
"U.S. Appl. No. 18/078,268, Response filed May 10, 2024 to Non Final Office Action mailed Dec. 15, 2023", 13 pgs.
"U.S. Appl. No. 17/946,337, Notice of Allowance mailed May 15, 2024", 12 pgs.
"U.S. Appl. No. 17/805,127, Supplemental Notice of Allowability mailed May 20, 2024", 2 pgs.

* cited by examiner

SELECTIVE LOCATION-BASED IDENTITY COMMUNICATION

CLAIM OF PRIORITY

This application is a continuation of and claims priority benefit of U.S. patent application Ser. No. 17/248,841, filed on Feb. 10, 2021, which is a continuation of and claims priority benefit of U.S. patent application Ser. No. 16/245,660, filed on Jan. 11, 2019, which is a continuation of and claims priority benefit of U.S. patent application Ser. No. 15/859,101, filed on Dec. 29, 2017, which claims priority benefit of U.S. Provisional Patent Application Ser. No. 62/491,115 filed on Apr. 27, 2017, and U.S. Provisional Patent Application Ser. No. 62/554,937 filed on Sep. 6, 2017, each of which are incorporated herein by reference in their entireties.

TECHNICAL FIELD

Embodiments of the present disclosure relate generally to selective communication of a location-based identification. More particularly, but not by way of limitation, the present disclosure addresses systems and methods for determining a location of a mobile computing device and selectively presenting location information of the mobile computing device at other mobile computing devices.

BACKGROUND

Social media applications implement computer-mediated technologies allowing for the creating and sharing of content that communicates information, ideas, interests, and other forms of expression via virtual communities and networks. Social media platforms use web-based technologies, desktop computers, and mobile technologies (e.g., smartphones and tablet computers) to create highly interactive platforms through which individuals, communities, and organizations can share, co-create, discuss, and modify user-generated content or pre-made content posted online.

Mobile electronic devices on which end-user social media applications can be executed typically provide geolocation services that determine the geographic location of the mobile electronic device, by extension indicating the geographic location of the associated user. Social media content posted by users is often geo-tagged based on the geolocation of a mobile electronic device (such as a mobile phone) by use of which the social media content is captured and/or posted to the social media platform. In other embodiments, social media content may explicitly be geo-tagged by a user using a computer device that does not have activated geo-location services and/or that is not a mobile device (such as a desktop PC).

BRIEF DESCRIPTION OF THE DRAWINGS

Various ones of the appended drawings merely illustrate example embodiments of the present disclosure and should not be considered as limiting its scope.

Figure 1:
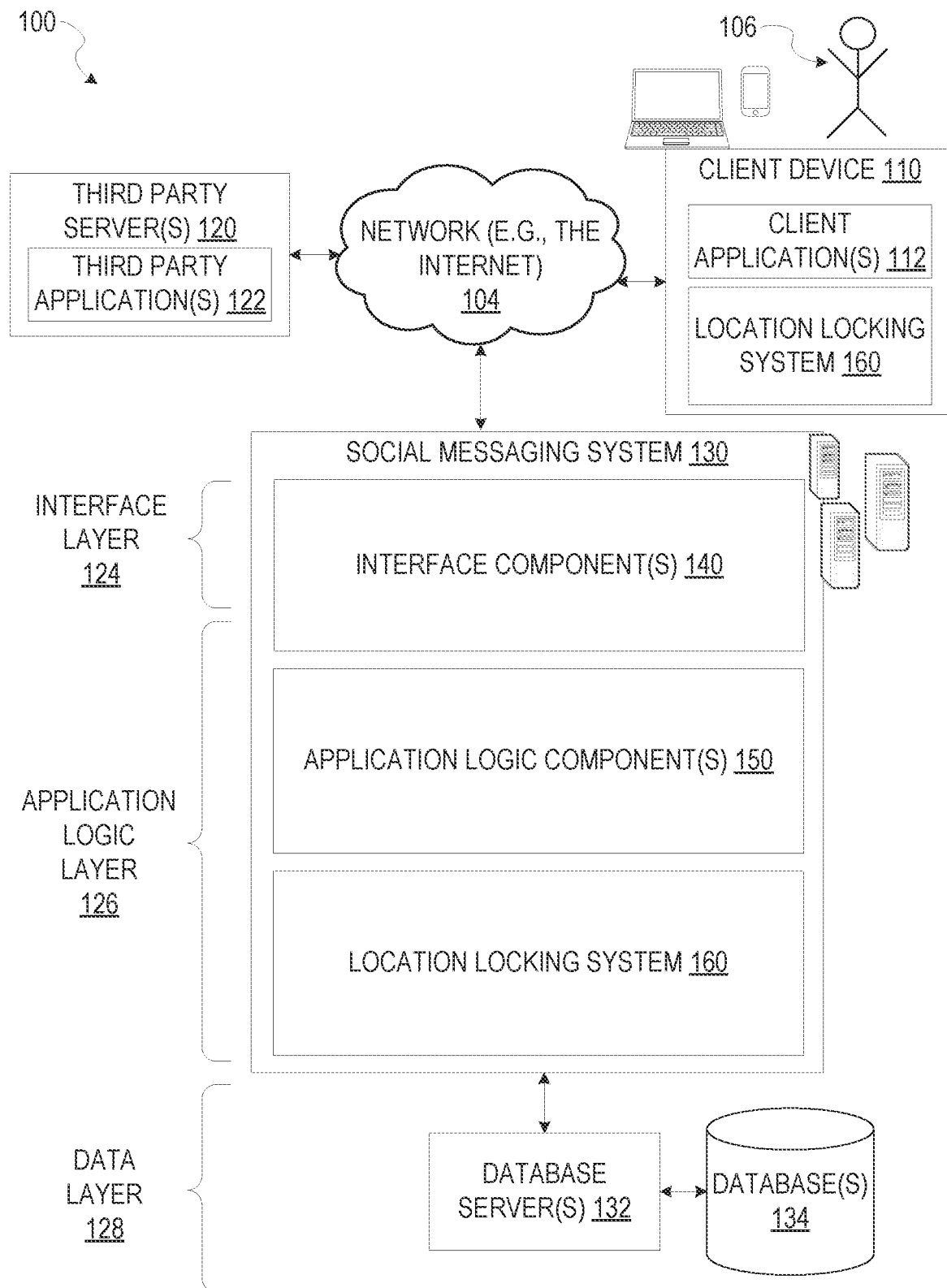
FIG. 1 is a block diagram illustrating a network system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

One aspect of the present disclosure describes a system for selectively blocking location identification of a mobile computing device. In some embodiments, an application implementing a portion of the systems and methods described herein is presented to a user of a mobile computing device. The application presents an interstitial interface screen. The user may interact with the interstitial interface screen to turn on a blocking mode which selectively blocks transmission or display of location information for a period of time. For example, a user may select a three hour or twenty-four hour window, during which location information for the mobile computing device is not transmitted or displayed to a set of users or a set of mobile computing devices for users known to the user selecting the blocking window. The period of time may enable the user to initiate a location-blocking service and automatically terminate the location-blocking service.

In some embodiments, a user interacts with a graphical user interface displayed on their mobile computing device to enable a blocking mode. The user interface displays an interstitial screen presenting a set of options for the blocking mode. For example, the interstitial screen may provide options for enabling the blocking mode based on a time (e.g., three hours, twenty-four hours, or forever), a location or proximity to a location, a time of day, a time of month or year, interaction with a designated application (e.g., a text messaging application, an active telephone call, a video call, or a video game application), or any other suitable selection metric, characteristic, or aspect. In some embodiments, options for enabling the blocking mode may include a toggle for automatically enabling the blocking mode (e.g., ghost mode). The automatic toggling may be time based, location based, proximity based (e.g., based on a proximity to a specified location), combinations thereof, or based on other suitable attributes. For example, the blocking mode may automatically be toggled when a user returns home or is within a specified proximity of their home or a specified location. The systems and methods described herein may detect a home location by analyzing a location history over time, provided based on user permission or selection of location services. For example, the systems may determine a frequent charging location for a device, or a location associated with one or more specified time periods (e.g., overnight). Proximity to the automatically detected home location may automatically engage the blocking mode, and the blocking mode may be disengaged once the mobile computing device moves a predetermined distance from the home location. In instances where automated toggling of the blocking mode is time based, the systems and methods described herein may automatically block location sharing based on a time of day (e.g., a current time being past a specified hour of the day or night).

In embodiments where the blocking mode is time based, the blocking mode may automatically end or be disabled after a termination of the selected time period. Prior to termination, the blocking mode may cause presentation of a timer subtext indicating an amount of time remaining within the time period for the blocking mode. Where the blocking mode is based on a location or proximity to a location, the blocking mode may cause presentation of a proximity subtext indicating initiation of the blocking mode or termination of the blocking mode, or the mobile computing device approaching a boundary which would initiate or terminate the blocking mode.

The above is one specific example. The various embodiments of the present disclosure relate to devices and instructions that cause one or more processors of a device to selectively present or block transmission, sharing, display, or other presentation of location information or identification. A location locking system is described that enables selectively blocking location identification of a mobile computing device, such that a user may select a user interface element to share location information with friends, preclude certain friends from receiving location information, or generally prohibit others from viewing the user's location.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although the network system 100 is illustrated herein as having a client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of the instructions, as a special-purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as having a three-tiered architecture, the inventive subject matter is by no means limited to such an architecture.

As shown in FIG. 1, the interface layer 124 consists of interface component(s) (e.g., a web server) 140, which receive requests from various client-computing devices and servers, such as a client device 110 executing client application(s) 112, and third-party server(s) 120 executing third-party application(s) 122. In response to received requests, the interface component(s) 140 communicate appropriate responses to requesting devices via a network 104. For example, the interface component(s) 140 can receive requests such as Hypertext Transfer Protocol (HTTP) requests, or other web-based, Application Programming Interface (API) requests.

The client device 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client device 110 forms all or part of a location locking system 160 such that components of the location locking system 160 configure the client device 110 to perform a specific set of functions with respect to operations of the location locking system 160.

In an example, the client device 110 is executing the client application(s) 112. The client application(s) 112 can provide functionality to present information to a user 106 and communicate via the network 104 to exchange information with the social messaging system 130. Further, in some examples, the client device 110 executes functionality of the location locking system 160 to enable selective blocking of location identification of a mobile computing device (e.g., client device 110).

A client device 110, or each client device 110 interacting with the network system 100, can comprise a computing device that includes at least a display and communication capabilities with the network 104 to access the social messaging system 130, other client devices, and third-party server(s) 120. Client devices 110 comprise, but are not limited to, remote devices, work stations, computers, general-purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. The user 106 can be a person, a machine, or other means of interacting with the client device 110. In some embodiments, the user 106 interacts with the social messaging system 130 via the client device 110. The user 106 may not be part of the network system 100, but may be associated with the client device 110.

As shown in FIG. 1, the data layer 128 has database server(s) 132 that facilitate access to information storage repositories or database(s) 134. The database(s) 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface component(s) 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with at least a portion of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the location locking system 160 capable of selectively blocking location identification of a mobile computing device. Similarly, the client device 110 includes at least a portion of the location locking system 160, as described above. In other examples, the client device 110 may include the entirety of the location locking system 160. In instances where the client device 110 includes a portion of (or all of) the location locking system 160, the client device 110 can work alone or in cooperation with the social messaging system 130 to provide the functionality of the location locking system 160 described herein.

In some embodiments, the social messaging system 130 may be an ephemeral message system that enables ephemeral communications where content (e.g., video clips or images) is deleted following a deletion trigger event such as a viewing time or viewing completion. In such embodiments, a device uses the various components described herein within the context of any of generating, sending, receiving, or displaying aspects of an ephemeral message. For example, a device implementing the location locking system 160 may selectively block location identification of a mobile computing device in response to a time-based selection by a user. The device may selectively block broadcast or transmission of location information as a part of interacting with the social messaging system 130. In some embodiments, the selective location blocking may be performed during generation and transmission of content for an ephemeral message.

Figure 2:
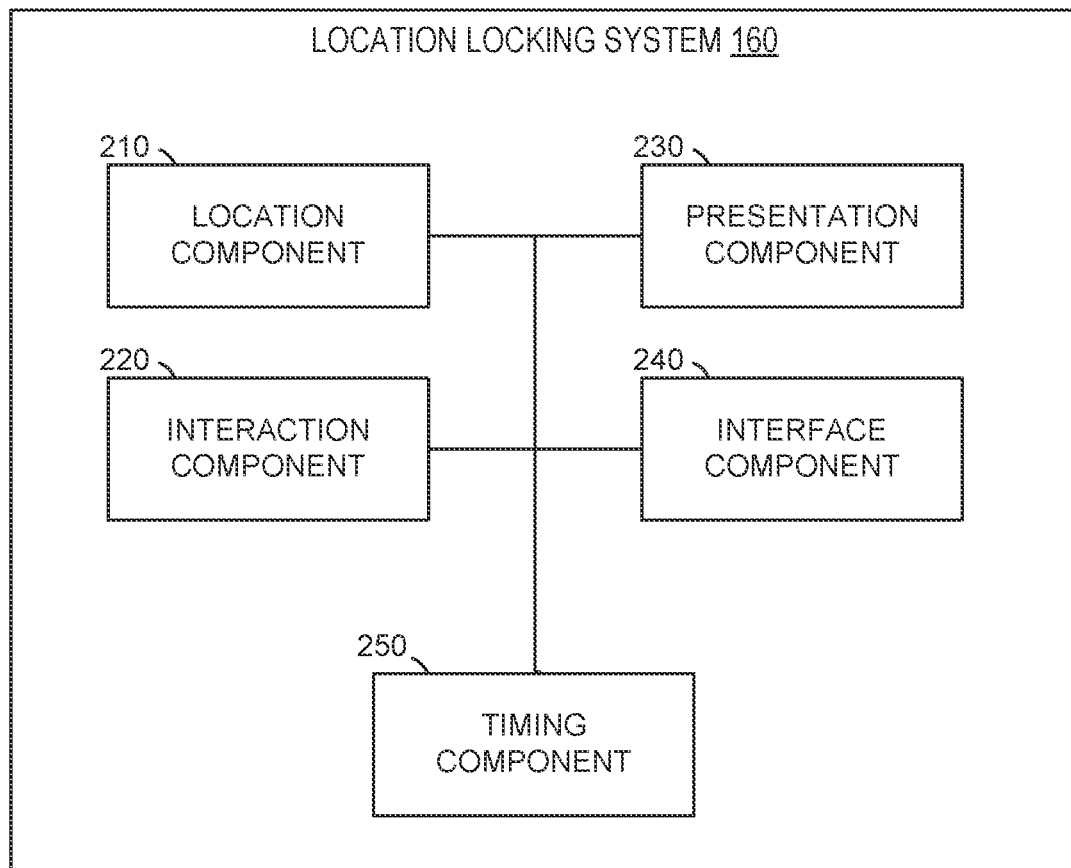
FIG. 2 is a diagram illustrating a location locking system, according to some example embodiments.

In FIG. 2, in various embodiments, the location locking system 160 can be implemented as a standalone system or implemented in conjunction with the client device 110, and is not necessarily included in the social messaging system 130. The location locking system 160 is shown to include a location component 210, an interaction component 220, a presentation component 230, an interface component 240, and a timing component 250. All, or some, of the components 210-250 communicate with each other, for example, via a network coupling, shared memory, and the like. Each component of the components 210-250 can be implemented as a single component, combined with other components, or further subdivided into multiple components. Other components not pertinent to example embodiments can also be included, but are not shown.

Figure 3:
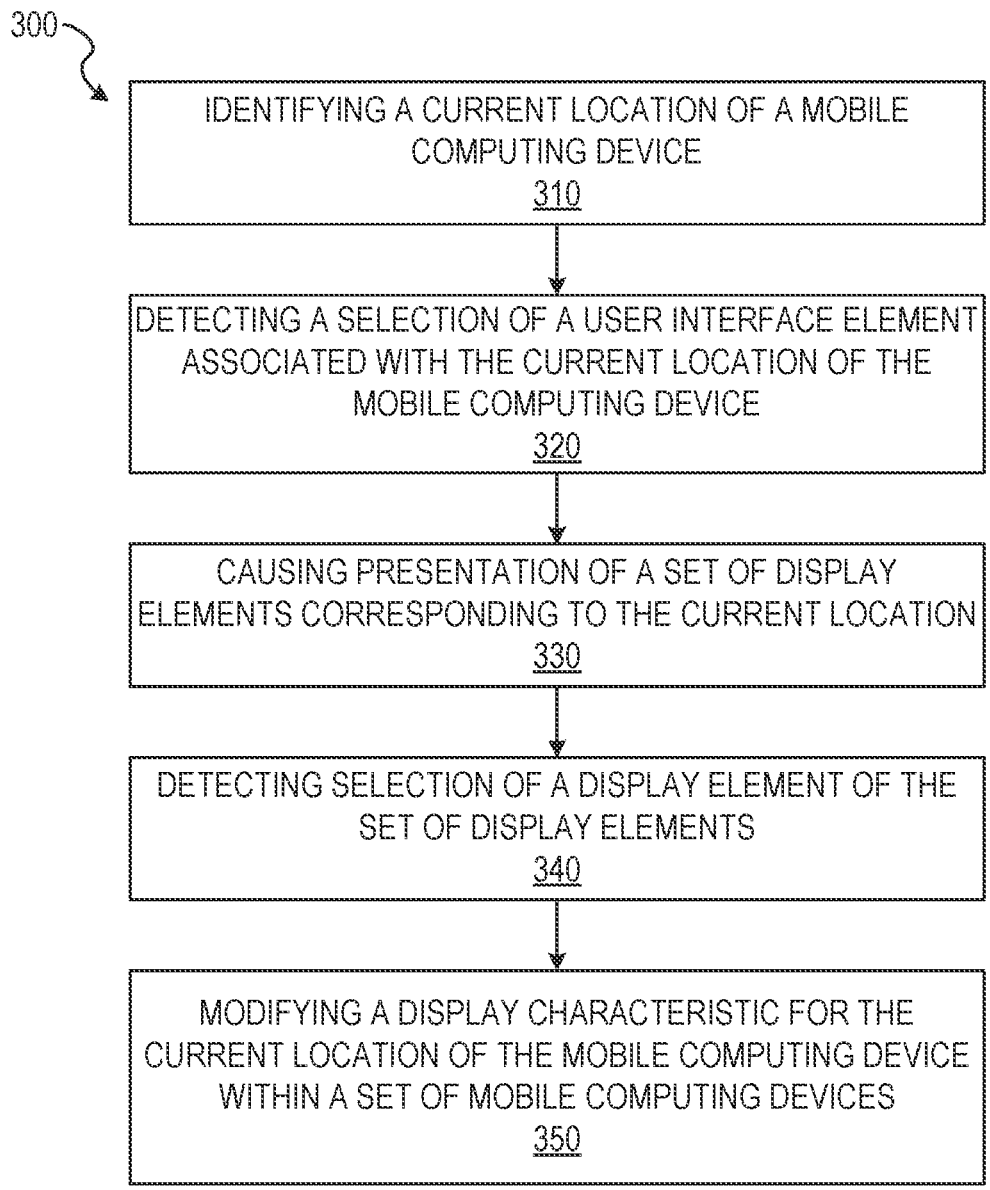
FIG. 3 is a flow diagram illustrating an example method for selectively blocking location identification of a mobile computing device, according to some example embodiments.

FIG. 3 depicts a flow diagram illustrating an example method 300 for selectively blocking location identification of a mobile computing device. The operations of the method 300 may be performed by components of the location locking system 160, and are so described below for purposes of illustration.

In operation 310, the location component 210 identifies a current location of a mobile computing device (e.g., the client device 110). The location component 210 may identify the current location of the mobile computing device via triangulation of one or more signals of the mobile computing device interacting with one or more transmission towers, via Global Positioning System signals, via movement information generated by one or more sensors of the mobile computing device, via entry of location information by a user, via one or more location services enabled for an application operating on the mobile computing device, combinations thereof, or by any other suitable means. In some instances, the location component 210 identifies the current location of the mobile computing device upon initiation or opening of an application on the mobile computing device. The application may be associated with the location locking system 160, such as an application of the social messaging system 130.

Figure 4:
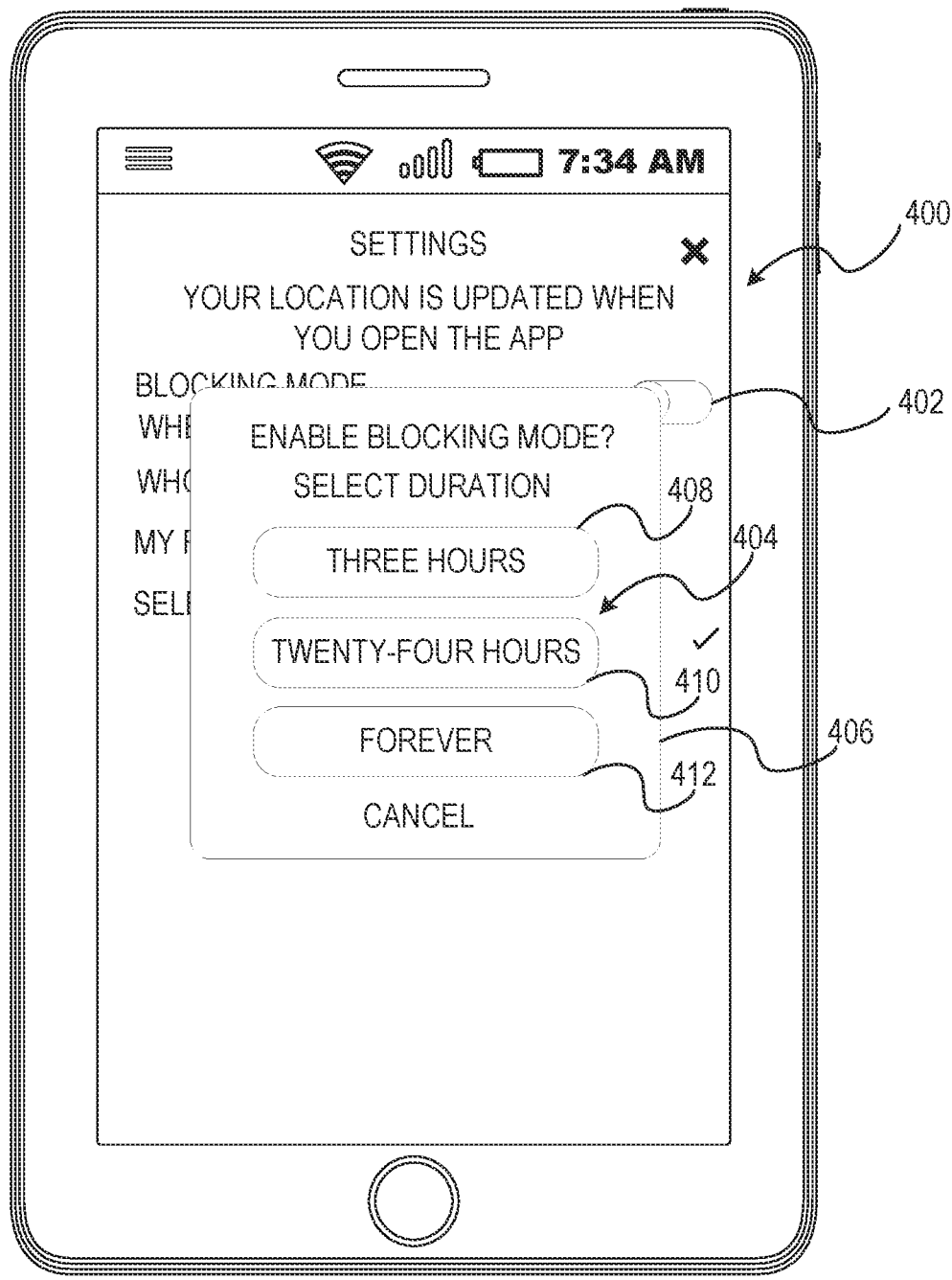
FIG. 4 is a user interface diagram depicting graphical user interface elements for selectively blocking location information, according to some example embodiments.
Figure 5:
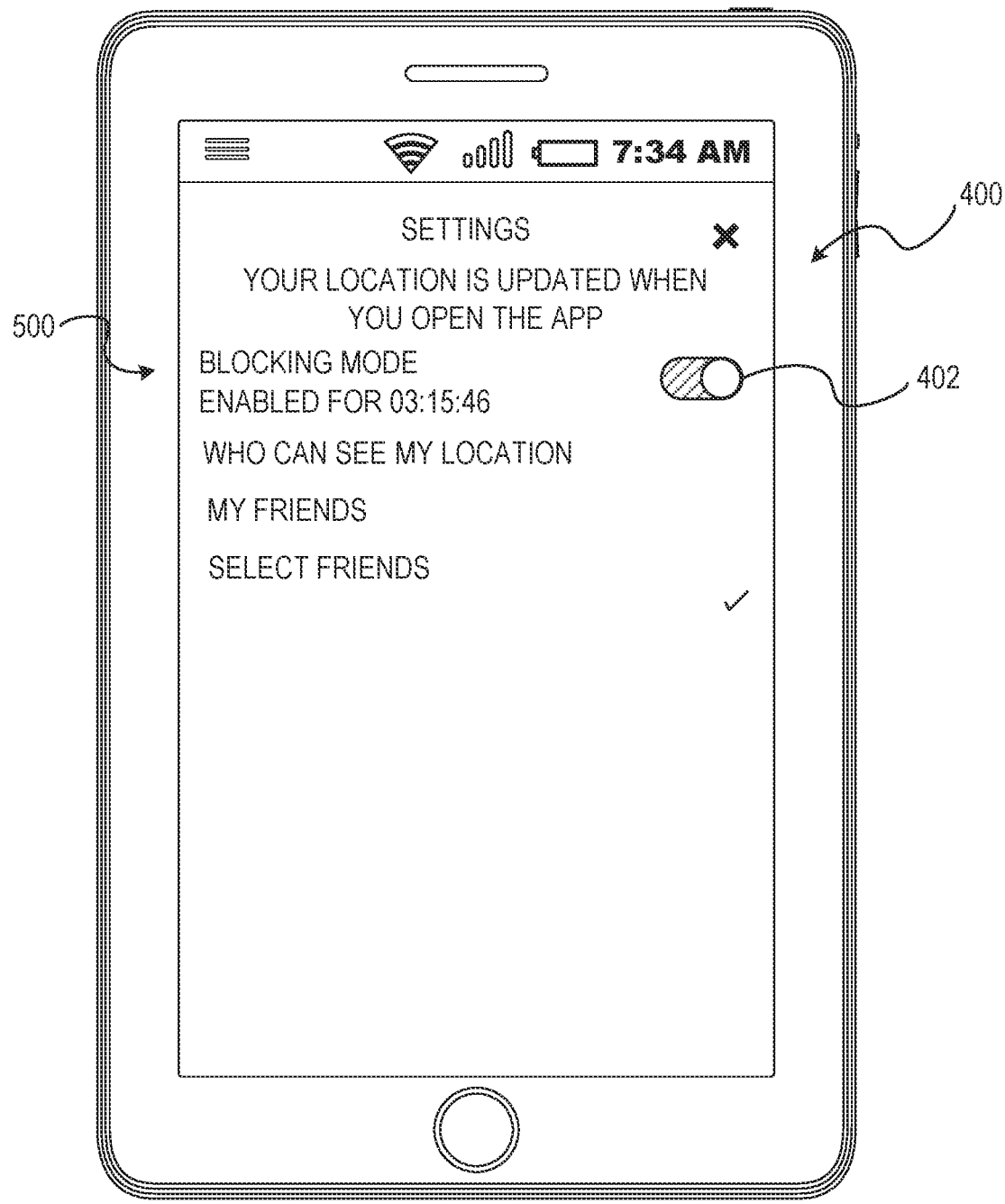
FIG. 5 is a user interface diagram depicting graphical user interface elements for selectively blocking location information, according to some example embodiments.

In operation 320, the interaction component 220 detects a selection of a user interface element associated with the current location of the mobile computing device. In some embodiments, the user interface element is presented in a graphical user interface depicted on a display component of the mobile computing device during operation of the application. As shown in FIGS. 4-5, a blocking element 402 may be presented within a graphical user interface 400 for the application. The blocking element 402 may correspond to a blocking mode of the location locking system 160. The blocking mode may prevent the mobile computing device or a server associated with the location locking system 160 from identifying, transmitting, or otherwise sharing location information (e.g., the current location) of the mobile computing device with one or more other mobile computing devices associated with one or more of the user of the mobile computing device, users within a social network of the user of the mobile computing device, the social messaging system 130, the location locking system 160, or combinations thereof.

In some embodiments, the blocking mode may be referenced or further referred to herein as a "ghost mode." In the ghost mode, location sharing is toggled to an off position and the user is no longer displayed on graphical user interfaces on others' devices. Note that the ghost mode functionality described herein is to be distinguished from turning off location services on a mobile user device. Thus, when ghost mode is turned on, the device location services are still functioning, so that the user location can still be determined and displayed on a map graphical user interface, with social media content captured in ghost mode still being geotagged. When the user turns on ghost mode after previously being present on the map, the user's bitmoji may disappear within seconds from other people's maps. When in ghost mode, the user can still see anyone on the map who has chosen to share their location with the user. In this example embodiment, each user is represented by a bitmoji. If the friend does not have a bitmoji, a profile picture within a user interface element (e.g., a ghost icon) is shown. If no profile picture is available for a particular friend, a default icon (e.g., a blank ghost) is displayed at the corresponding location.

In operation 330, the presentation component 230 causes presentation of a set of display elements. In some embodiments, the set of display elements corresponds to the current location identified in operation 310. The set of display elements may represent one or more display characteristics for the current location of the mobile computing device. Display characteristics may include colors, shapes, ideograms, characters, digital representations of users, locations on a map, combinations thereof, and any other suitable representation or set of representations.

As shown in FIG. 4, a set of display elements 404 may be presented within an interstitial display element 406. The interstitial display element 406 may be presented as an overlay on or otherwise obfuscating at least a portion of the graphical user interface 400. In some embodiments, once the blocking element 402 is selected, the graphical user interface 400 may be locked until the mobile computing device or the location locking system 160 detects selection of at least one of the set of display elements 404. In some instances, as shown in FIG. 4, the set of display elements 404 represents selections indicating limitations to be placed on sharing or otherwise transmitting the current location of the mobile computing device. In FIG. 4, the set of display elements includes three time periods: a first element 408 for a three hour time period, a second element 410 for a twenty-four hour period, and a third element 412 for an indeterminate period (e.g., forever).

In operation 340, the interaction component 220 detects selection of a display element of the set of display elements. In some embodiments, the interaction component 220 detects user interaction with an input device representing selection of the display element. For example, the interaction component 220 may include or cooperate with a user interface component, such as a touch screen, to detect a user interaction with the mobile computing device and identify a user interface element with which the user intends to interact. For example, the user may tap or touch a touch screen at a position proximate to or covering the first element 408.

Figure 8:
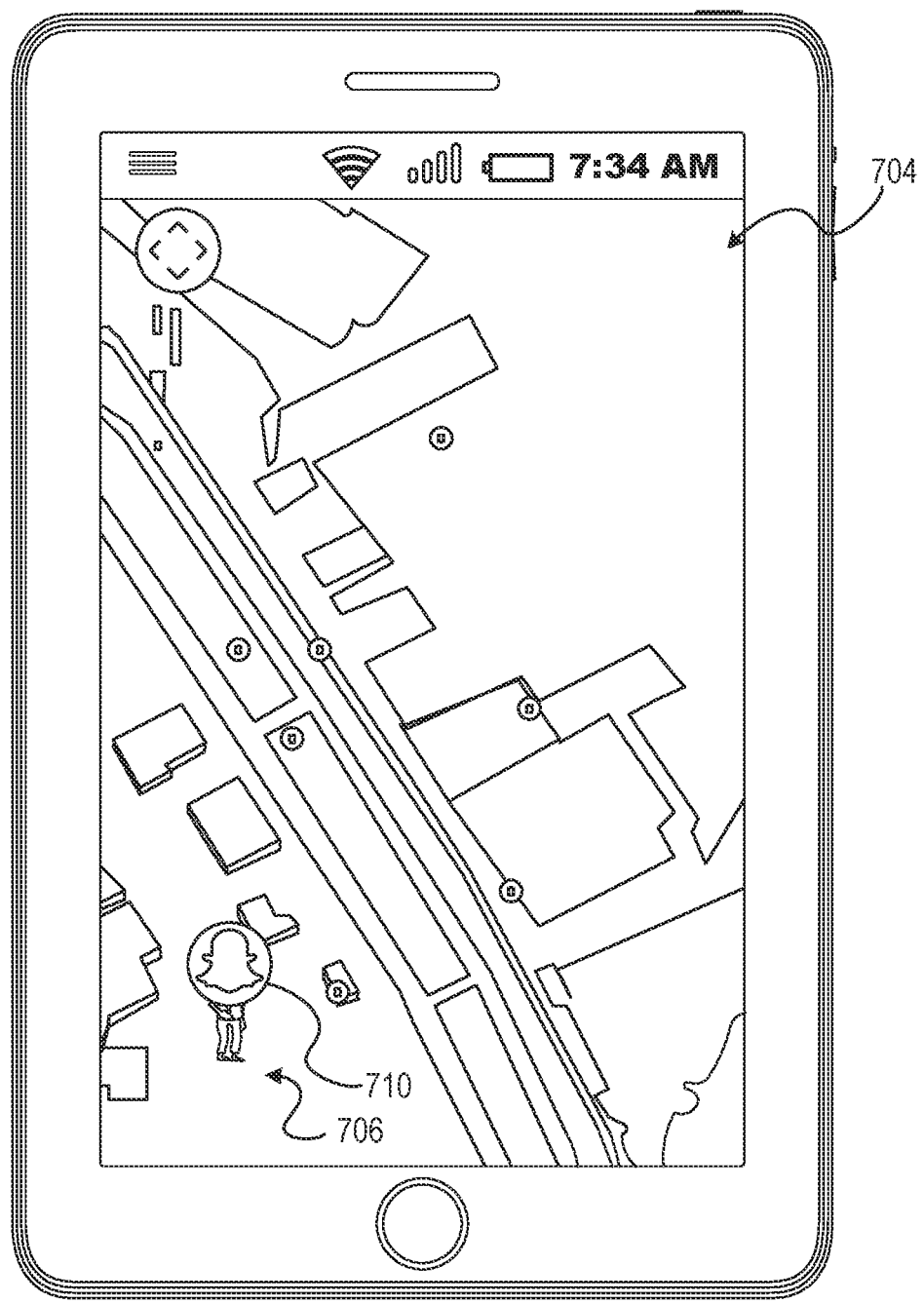
FIG. 8 is a user interface diagram depicting graphical user interface elements for blocking location information, according to some example embodiments.

In operation 350, the interface component 240 modifies a display characteristic for the current location of the mobile computing device within a set of mobile computing devices. For example, as shown in FIG. 8, the interface component 240 may obfuscate a portion of an avatar representing the current location of the mobile computing device. In some embodiments, the set of mobile computing devices are distinct from the mobile computing device associated with the current location identified in operation 310. In some instances, the mobile computing device is associated with a first user and the set of mobile computing devices are associated with a set of second users. The set of second users may be linked or otherwise associated with the first user, such as by connections within a social network defined within the social messaging system 130.

The interface component 240 may modify the display characteristic for the current location of the mobile computing device by removing an icon, representative of the mobile computing device, from a display presented at one or more of the mobile computing devices of the set of mobile computing devices. For example, the current location of the user and the mobile computing device may be presented or represented, on mobile computing devices of friends, family, and members of the user's social network, as an icon. The icon may be a picture of the user, an ideograph (e.g., an emoji, an ideogram, or a digital sticker), an avatar, an image selected by the user, a logo, or any other suitable graphical representation of the user. The icon may be presented within graphical user interfaces displayed on the set of mobile computing devices while the mobile computing device of the user is in a location-sharing mode. A position of the icon within a map, depicted on a screen of the client device 110 within a user interface, may be updated periodically (e.g., upon the user logging into an application associated with the location locking system 160 or the social messaging system 130), in real time (e.g., by continually updating or monitoring the position of the user while the user is interacting with the application), in near-real time (e.g., by position polling or periodically updating at a specified time interval), or according to any other suitable position-updating scheme.

Upon detecting selection of a display element of the set of display elements indicating a location locking interaction, the interface component 240 may modify one or more aspects of the graphical user interface at the mobile computing device of the user and at the set of mobile computing devices of users associated with a social network of the user, or otherwise suitably connected to the user. As described above, where the current location of the mobile computing device is presented as an icon on a map, the interface component 240 may modify the display characteristic by removing the icon on the map depicted on the set of mobile computing devices.

In some embodiments, the interface component 240 modifies the display characteristic by locking the current position of the icon on the map. While the user and the mobile computing device may change position, the icon remains locked in the last location identified prior to receiving the location locking interaction. In addition to locking the position of the icon, the interface component 240 may also generate a representation of the location locking interaction. For example, the interface component 240 may change a color of the icon, place a strike or "X" over the icon, or otherwise indicate that the location is locked or otherwise precluded from updating or sharing.

Figure 6:
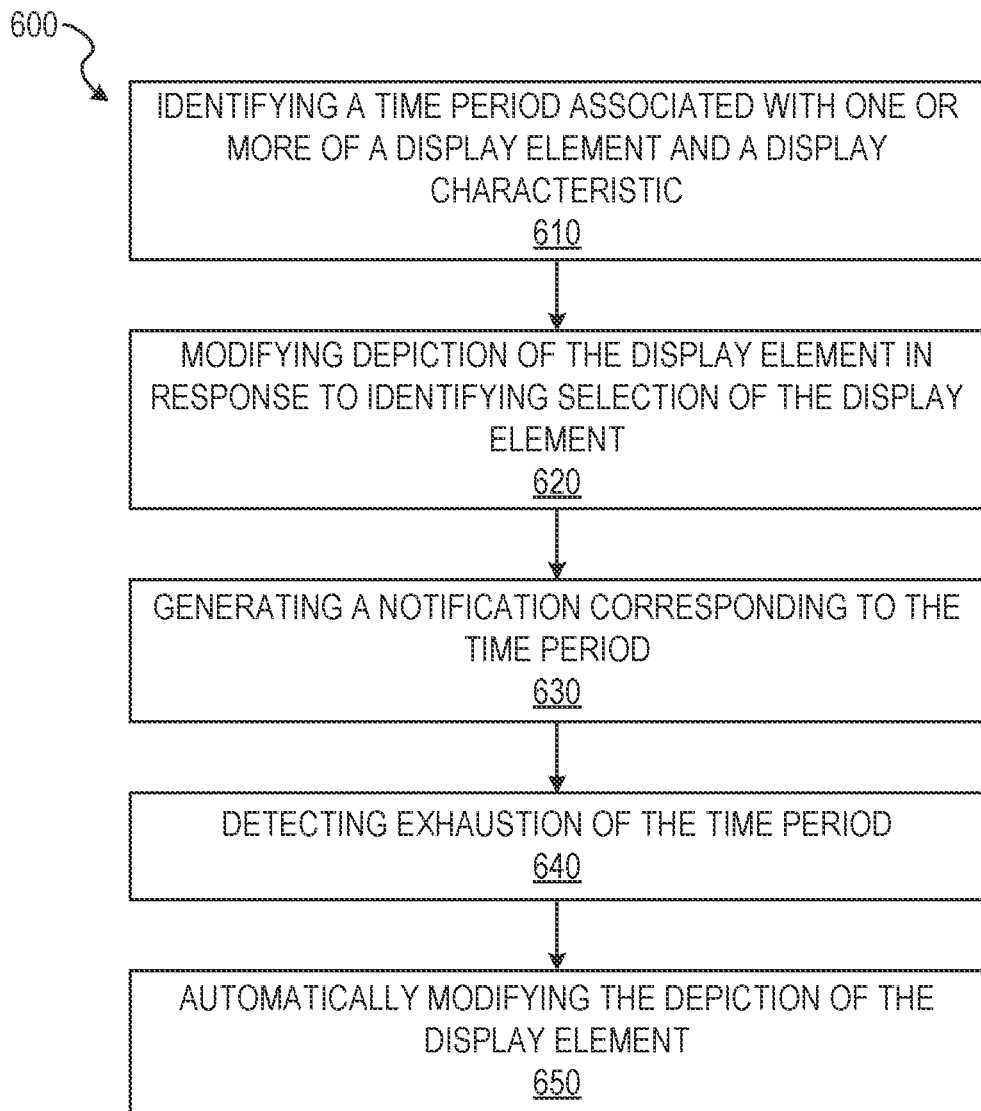
FIG. 6 is a flow diagram illustrating an example method for selectively blocking location identification of a mobile computing device, according to some example embodiments.

FIG. 6 depicts a flow diagram illustrating an example method 600 for selectively blocking location identification of a mobile computing device. The operations of the method 600 may be performed by components of the location locking system 160. In some instances, certain operations of the method 600 may be performed using one or more operations of the method 300 or as sub-operations of one or more operations of the method 300, as will be explained in more detail below.

In operation 610, the timing component 250 identifies a time period. In some embodiments, the time period is associated with one or more of the display element, the display characteristic, or combinations thereof. Upon identifying the time period, the timing component 250 may initiate the time period. The time period may be initiated in association with the display element, and at a first time. In some instances, the first time corresponds to selection of the display element.

In operation 620, the interface component 240 modifies a depiction of the display element. In some embodiments, the interface component 240 modifies the depiction of the display element in response to detecting selection of the display element. For example, as shown in FIG. 5, a display element 500 may be depicted within the graphical user interface 400, proximate to the blocking element 402, and represent information related to the blocking element 402. Once the blocking element 402 is selected and a display element of the set of display elements 404 is selected, the interface component 240 may modify presentation of the display element to include at least a portion of the time period.

Figure 7:
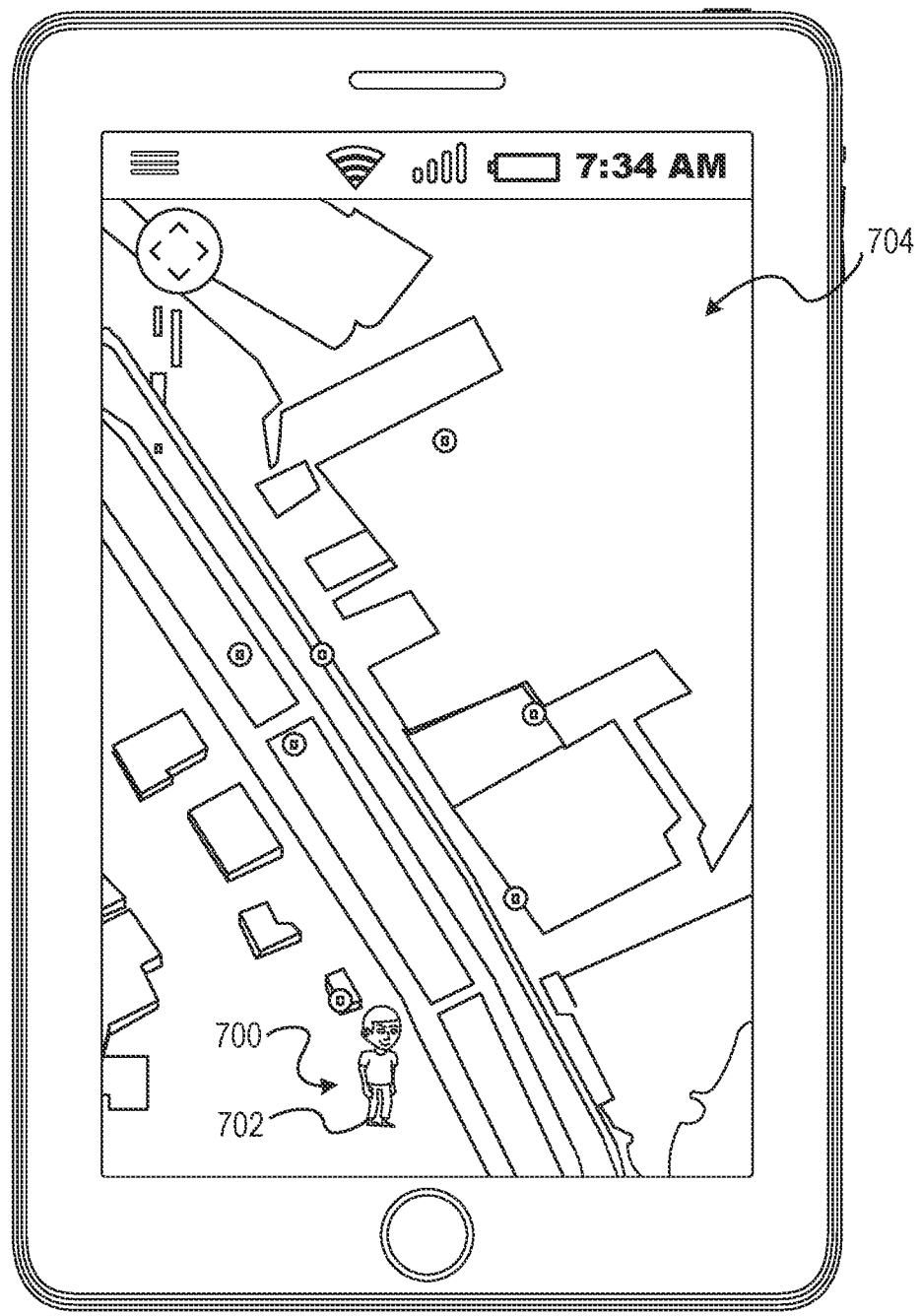
FIG. 7 is a user interface diagram depicting graphical user interface elements presenting location information, according to some example embodiments.

In some embodiments, along with modifying the depiction of the display element, the interface component 240 modifies a display characteristic for the current location of the mobile computing device within a set of mobile computing devices. The display characteristic may be modified for the current location of the mobile computing device by changing the current location from a first display characteristic to a second display characteristic. For example, as shown in FIG. 7, a first display characteristic 700 may comprise an avatar 702 associated with a user of the mobile computing device. The first display characteristic 700 may also include a position or location on a map 704. The avatar 702 may be depicted as positioned on the map 704 within the set of mobile computing devices (e.g., mobile computing devices of friends of the user). Modification of the first display characteristic 700 to the second display characteristic 706, shown in FIG. 8, may comprise presenting the avatar 702 with an obfuscating element 710 positioned over the avatar 702. For example, where the avatar 702 is a representation of the user of the mobile computing device (e.g., an animated person or character), the second display characteristic 706 may be generated by placing a mask, a sign, or another obfuscating element 710 in front of a face of the animated character or animating the character to place the mask, sign, or obfuscating element on the face of the character. In some instances, the second display characteristic 706 includes a location on the map 704, such as a subsequent location at which the animated character is positioned at a time subsequent to the position of the animated character at a location associated with the first display characteristic 700.

In operation 630, the interface component 240 generates a notification corresponding to the time period. In some embodiments, the notification is presented within a graphical user interface proximate to the modified depiction of the display element. As shown in FIG. 5, the notification may be included in the display element 500 as a countdown or timer corresponding to the time period.

In operation 640, the timing component 250 detects exhaustion of the time period. The exhaustion of the time period may be detected at a time (e.g., a second time) subsequent to a time (e.g., a first time) at which the time period is initiated, as in operation 610. The timing component 250 may detect exhaustion of the time period by determining that a timer presented with the display element 500 has reached zero.

In some embodiments, as described above with respect to operation 620, where the interface component 240 modifies the display element and the display characteristic, for the current location, from the first display characteristic to the second display characteristic, the interface component 240 may automatically modify the display characteristic of the current location from the second display characteristic to a third display characteristic. In some instances, modification of the current location from the second display characteristic to the third display characteristic is performed automatically, in response to detecting the exhaustion of the time period by the timing component 250. In some instances, the third display characteristic is identical to the first display characteristic. In such instances, the interface component 240 may modify the current location from the second display characteristic to the third display characteristic by reverting display characteristics of the current location back to the first display characteristic.

In some instances, the interface component 240 modifies the second display characteristic to the third display characteristic by changing the second display characteristic to an intermediate characteristic. In such instances, the interaction component 220 detects an interaction at the mobile computing device. In response to the interaction component 220 detecting the interaction, the interface component 240 modifies the intermediate characteristic of the current location to the first display characteristic.

In operation 650, the interface component 240 automatically modifies the depiction of the display element. In some embodiments, the interface component 240 reverts the depiction in response to detecting exhaustion of the time period. In some embodiments, as shown in FIGS. 7-8, the interface component 240 may revert the depiction by removing the obfuscating element from in front of the avatar, determining a current location of the mobile computing device, and placing the avatar at a position on the map corresponding to the new current location.

As shown in FIGS. 7-8, toggling a blocking mode "on" may transition display of the user's location in others' graphical user interfaces from a representation in FIG. 7 to the representation in FIG. 8. Where the blocking mode is toggled "off," the display in the others' graphical user interfaces may transition from the representation in FIG. 8 to the representation in FIG. 7.

In some embodiments, in addition to user locations on a map, a carousel may be presented at each user's mobile computing device. The carousel may include icons and locations for each user sharing a current location with the viewing user. In some instances, each friend is represented by a respective rectangular friend panel or card at the bottom of the screen. Swiping left or right on the friend panel brings into view the next or previous friend panel, as the case may be. In some embodiments, swiping to a particular friend automatically centers the map view on the icon of that friend. Note that all of the user's friends sharing location should be visible in the carousel, not just those in the current viewport. Friends are in this embodiment ordered in the carousel by update recency.

In embodiments where users sharing current locations are presented in or represented within the carousel, toggling the ghost mode or blocking mode into an "on" position, precluding sharing of location information, the user may remain within the carousel. Though the user or a representation thereof remains in the carousel, location information may be removed from an access control list and the carousel. Users within the list or carousel may remain the same, while their location information is removed from a data structure or database populating the carousel or the access control list, preventing tracking of the user or viewing the current location of the user.

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform one or more operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an application programming interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 9:
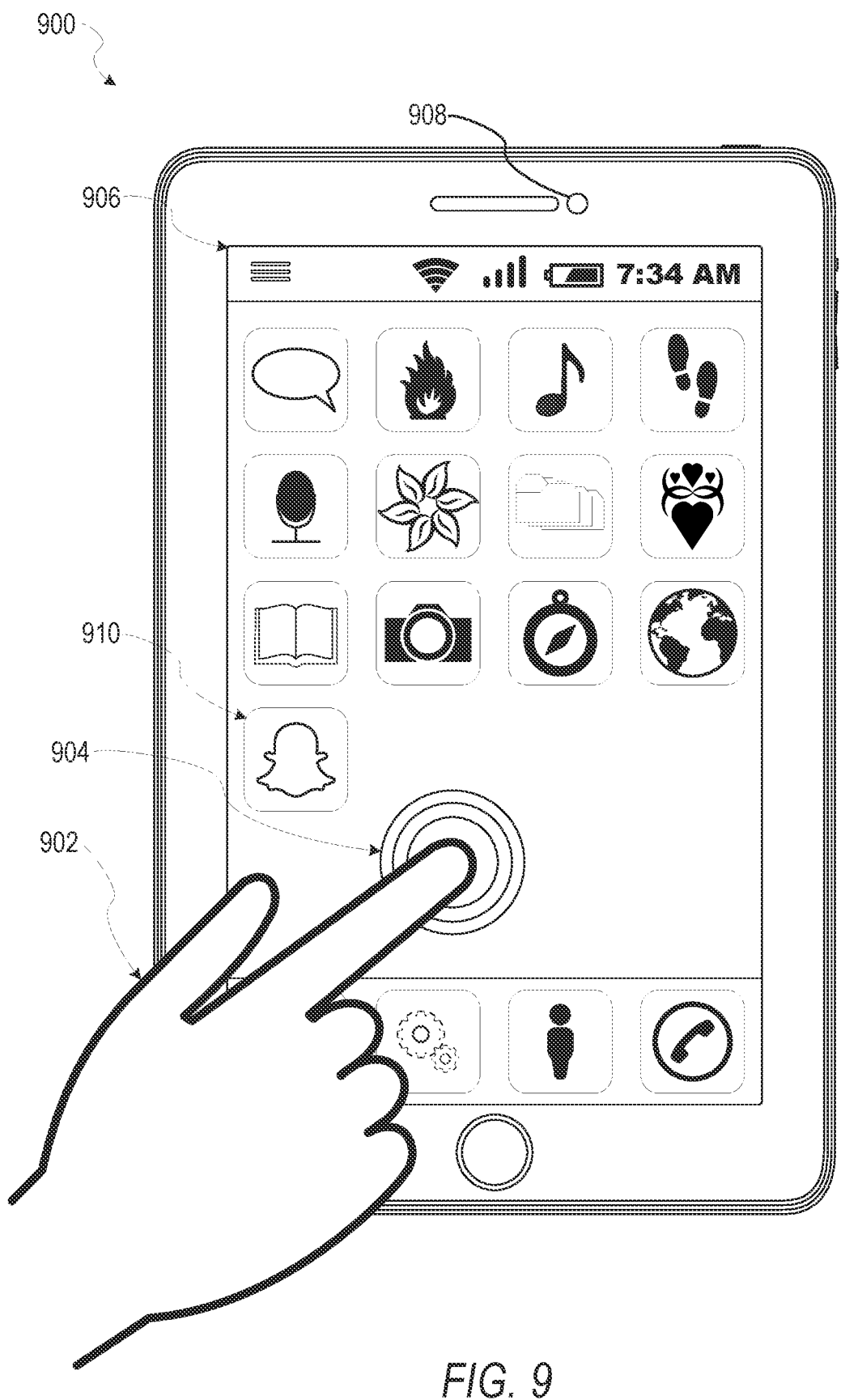
FIG. 9 is a user interface diagram depicting an example mobile device and mobile operating system interface, according to some example embodiments.

FIG. 9 illustrates an example mobile device 900 executing a mobile operating system (e.g., IOS™, ANDROID™, WINDOWS® Phone, or other mobile operating systems), consistent with some embodiments. In one embodiment, the mobile device 900 includes a touch screen operable to receive tactile data from a user 902. For instance, the user 902 may physically touch 904 the mobile device 900, and in response to the touch 904, the mobile device 900 may determine tactile data such as touch location, touch force, or gesture motion. In various example embodiments, the mobile device 900 displays a home screen 906 (e.g., Springboard on IOS™) operable to launch applications or otherwise manage various aspects of the mobile device 900. In some example embodiments, the home screen 906 provides status information such as battery life, connectivity, or other hardware statuses. The user 902 can activate user interface elements by touching an area occupied by a respective user interface element. In this manner, the user 902 interacts with the applications of the mobile device 900. For example, touching the area occupied by a particular icon included in the home screen 906 causes launching of an application corresponding to the particular icon.

The mobile device 900, as shown in FIG. 9, includes an imaging device 908. The imaging device 908 may be a camera or any other device coupled to the mobile device 900 capable of capturing a video stream or one or more successive images. The imaging device 908 may be triggered by the location locking system 160 or a selectable user interface element to initiate capture of a video stream or succession of images and pass the video stream or succession of images to the location locking system 160 for processing according to the one or more methods described in the present disclosure.

Many varieties of applications (also referred to as "apps") can be executing on the mobile device 900, such as native applications (e.g., applications programmed in Objective-C, Swift, or another suitable language running on IOS™ or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 900 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 900 includes a social messaging app 910 that, consistent with some embodiments, allows users to exchange ephemeral messages that include media content. In this example, the social messaging app 910 can incorporate aspects of embodiments described herein. For example, in some embodiments the social messaging app 910 includes an ephemeral gallery of media created by users of the social messaging app 910. These galleries may consist of videos or pictures posted by a user and made viewable by contacts (e.g., "friends") of the user. Alternatively, public galleries may be created by administrators of the social messaging app 910 consisting of media from any users of the application (and accessible by all users). In yet another embodiment, the social messaging app 910 may include a "magazine" feature which consists of articles and other content generated by publishers on the social messaging app 910's platform and accessible by any users. Any of these environments or platforms may be used to implement concepts of the present inventive subject matter.

In some embodiments, an ephemeral message system may include messages having ephemeral video clips or images which are deleted following a deletion trigger event such as a viewing time or viewing completion. In such embodiments, a device implementing the location locking system 160 may selectively block location information within a user interface configured to receive the ephemeral message, and transmit the ephemeral message to another device using the ephemeral message system, without presenting the location information of the user or the mobile computing device transmitting or generating the ephemeral message.

Software Architecture

Figure 10:
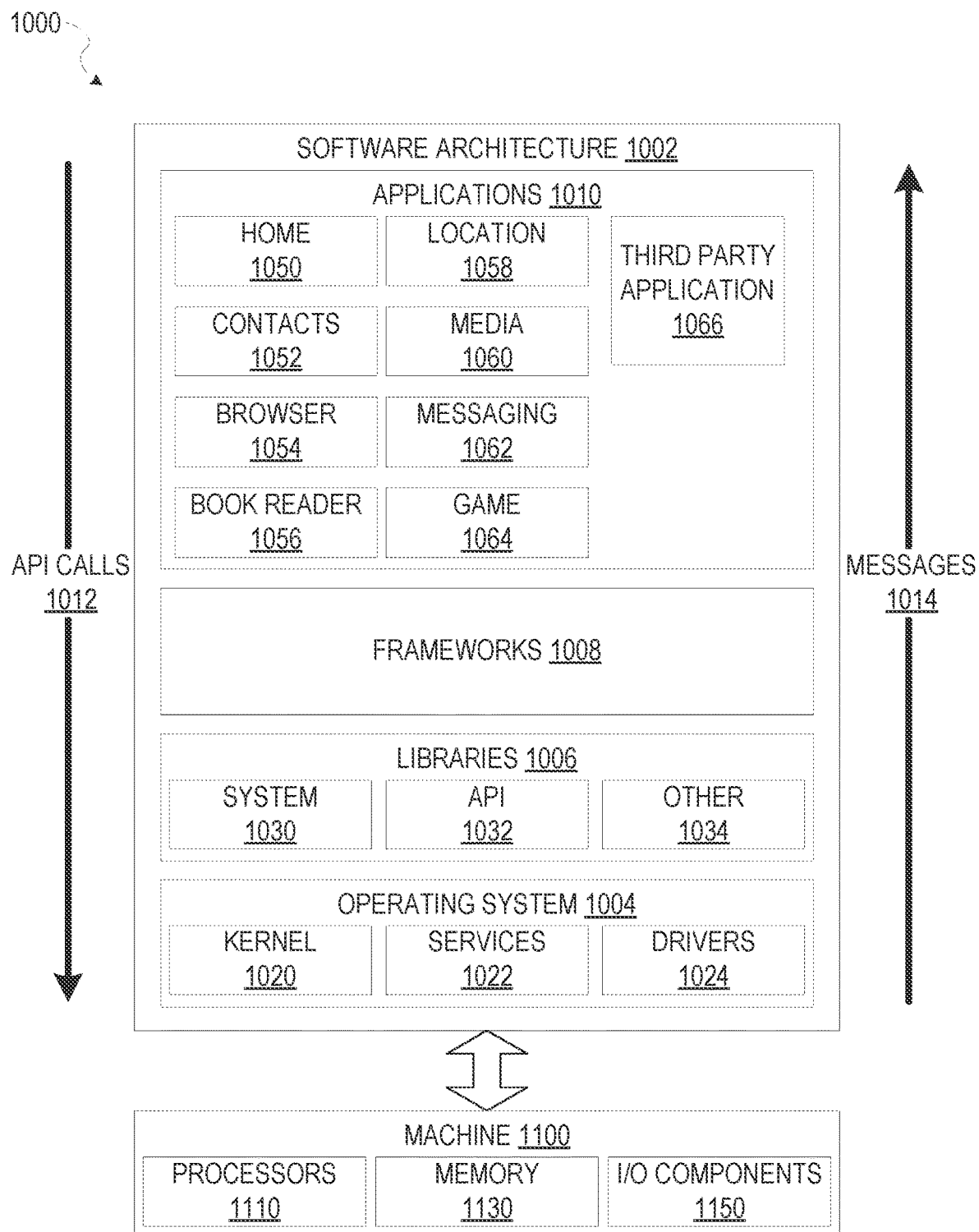
FIG. 10 is a block diagram illustrating an example of a software architecture that may be installed on a machine, according to some example embodiments.

FIG. 10 is a block diagram 1000 illustrating an architecture of software 1002, which can be installed on the devices described above. FIG. 10 is merely a non-limiting example of a software architecture, and it will be appreciated that many other architectures can be implemented to facilitate the functionality described herein. In various embodiments, the software 1002 is implemented by hardware such as a machine 1100 of FIG. 11 that includes processors 1110, memory 1130, and I/O components 1150. In this example architecture, the software 1002 can be conceptualized as a stack of layers where each layer may provide a particular functionality. For example, the software 1002 includes layers such as an operating system 1004, libraries 1006, frameworks 1008, and applications 1010. Operationally, the applications 1010 invoke application programming interface (API) calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third-party application 1066. According to some embodiments, the applications 1010 are programs that execute functions defined in the programs. Various programming languages can be employed to create the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™ WINDOWS® PHONE, or another mobile operating system. In this example, the third-party application 1066 can invoke the API calls 1012 provided by the operating system 1004 to facilitate functionality described herein.

Example Machine Architecture and Machine-Readable Medium

Figure 11:
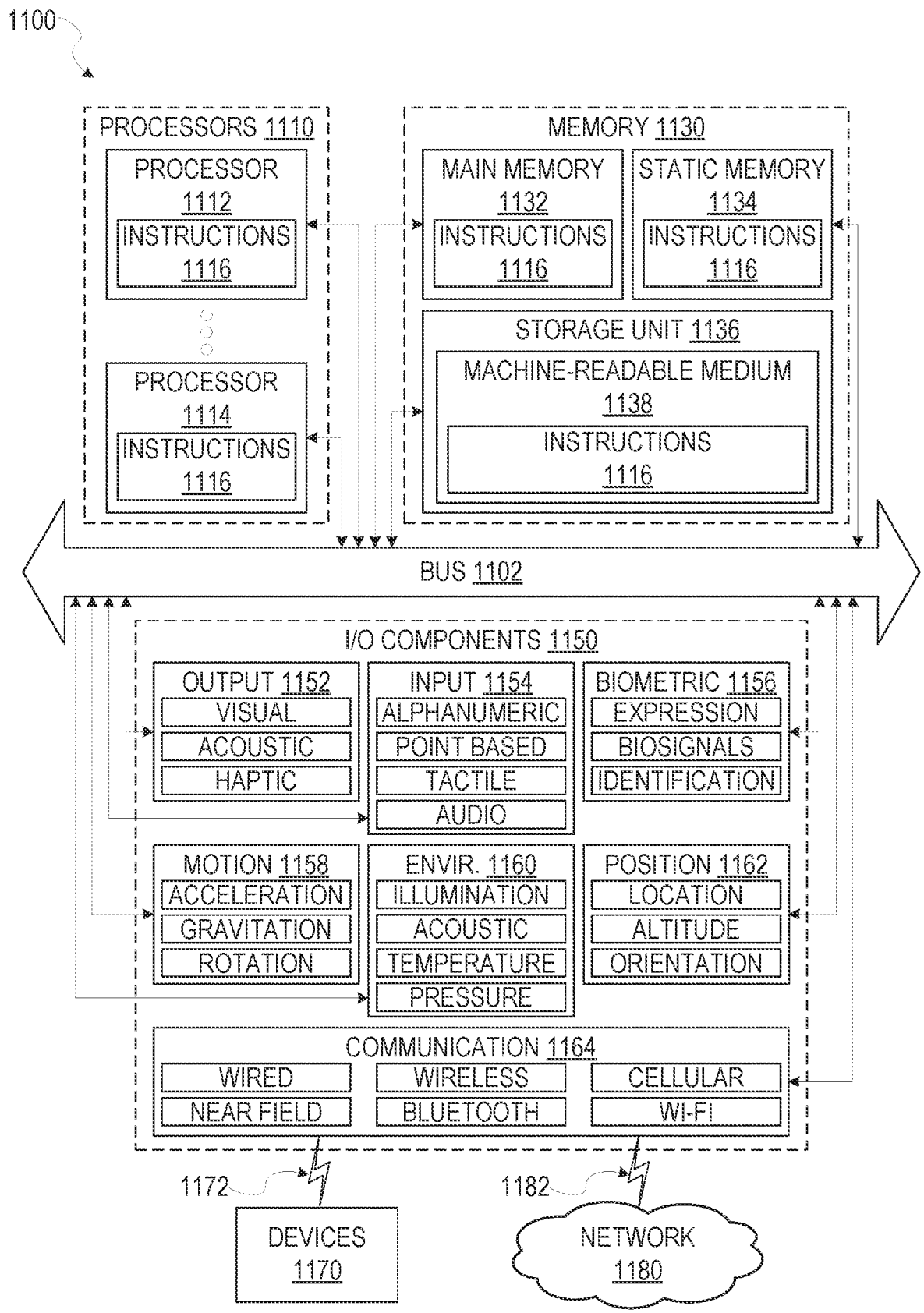
FIG. 11 is a block diagram presenting a diagrammatic representation of a machine in the form of a computer system within which a set of instructions may be executed for causing the machine to perform any of the methodologies discussed herein, according to an example embodiment.

FIG. 11 is a block diagram illustrating components of a machine 1100, according to some embodiments, able to read instructions (e.g., processor-executable instructions) from a machine-readable medium (e.g., a non-transitory machine-readable storage medium) and perform any of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any of the methodologies discussed herein can be executed. In alternative embodiments, the machine 1100 operates as a standalone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) include, for example, a processor 1112 and a processor 1114 that may execute the instructions 1116. The term "processor" is intended to include multi-core processors that may comprise two or more independent processors (also referred to as "cores") that can execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown in an example embodiment to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., the instructions 1116) for execution by a machine (e.g., the machine 1100), such that the instructions, when executed by processors of the machine (e.g., the processors 1110), cause the machine to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, the communication components 1164 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium should be considered as being transportable from one physical location to another. Additionally, since the machine-readable medium 1138 is tangible, the medium may be considered to be a machine-readable device.

Language

Throughout this specification, plural instances may implement components, operations, or structures described as a single instance. Although individual operations of one or more methods are illustrated and described as separate operations, one or more individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
identifying a time period associated with a mobile computing device;
initiating at a first time, the time period associated with the mobile computing device;
determining, based on historical location data, that a current location of the mobile computing device is within a predetermined distance from a historical location after the first time; and
in response to the determination:
automatically changing a first display characteristic representing the current location to a second display characteristic including modifying an original depiction of a display element to a second depiction of the display element with a notification; and
subsequent to the changing of the first display characteristic to the second display characteristic:
in response to detecting exhaustion of the time period at a second time subsequent to the first time:
automatically reverting the second depiction of the display element to the original depiction of the display element;
and
in response to determining that the mobile computing device is not within the predetermined distance from the historical location, reverting the second display characteristic to the first display characteristic.

2. The method of claim 1, wherein the historical location is associated with one or more specified time periods.

3. The method of claim 1, wherein the second display characteristic obfuscates at least a portion of the first display characteristic.

4. The method of claim 1, wherein the historical location is a home location associated with a user.

5. The method of claim 1, wherein modifying the first display characteristic comprises locking the current location of the mobile computing device.

6. A system comprising:
a memory that stores instructions; and
one or more processors configured by the instructions to perform operations comprising:
identifying a time period associated with a mobile computing device;
initiating at a first time, the time period associated with the mobile computing device;
determining, based on historical location data, that a current location of the mobile computing device is within a predetermined distance from a historical location after the first time; and
in response to the determination:
automatically changing a first display characteristic representing the current location to a second display characteristic including modifying an original depiction of a display element to a second depiction of the display element with a notification; and
subsequent to the changing of the first display characteristic to the second display characteristic:

in response to detecting exhaustion of the time period at a second time subsequent to the first time:
   automatically reverting the second depiction of the display element to the original depiction of the display element;
   and
   in response to determining that the mobile computing device is not within the predetermined distance from the historical location, reverting the second display characteristic to the first display characteristic.

7. The system of claim 6, wherein the historical location is associated with one or more specified time periods.

8. The system of claim 6, wherein the second display characteristic obfuscates at least a portion of the first display characteristic.

9. The system of claim 6, wherein the historical location is a home location associated with a user.

10. The system of claim 6, wherein modifying the first display characteristic comprises locking the current location of the mobile computing device.

11. A non-transitory processor-readable storage medium storing processor-executable instructions that, when executed by a processor of a machine, cause the machine to perform operations comprising:
   identifying a time period associated with a mobile computing device;
   initiating at a first time, the time period associated with the mobile computing device;
   determining, based on historical location data, that a current location of the mobile computing device is within a predetermined distance from a historical location after the first time; and
   in response to the determination:
      automatically changing a first display characteristic representing the current location to a second display characteristic including modifying an original depiction of a display element to a second depiction of the display element with a notification; and
      subsequent to the changing of the first display characteristic to the second display characteristic:
         in response to detecting exhaustion of the time period at a second time subsequent to the first time:
            automatically reverting the second depiction of the display element to the original depiction of the display element;
         and
         in response to determining that the mobile computing device is not within the predetermined distance from the historical location, reverting the second display characteristic to the first display characteristic.

12. The non-transitory processor-readable storage medium of claim 11, wherein the historical location is associated with one or more specified time periods.

13. The non-transitory processor-readable storage medium of claim 11, wherein the second display characteristic obfuscates at least a portion of the first display characteristic.

14. Non-transitory processor-readable storage medium of claim 11, wherein the historical location is a home location associated with a user.

* * * * *

UNITED STATES PATENT AND TRADEMARK OFFICE
CERTIFICATE OF CORRECTION

PATENT NO. : 12,058,583 B2
APPLICATION NO. : 17/818896
DATED : August 6, 2024
INVENTOR(S) : Brody et al.

Page 1 of 1

It is certified that error appears in the above-identified patent and that said Letters Patent is hereby corrected as shown below:

On the Title Page

On page 12, in Column 1, item (56) under "Other Publications", Line 59, delete "malled" and insert --mailed-- therefor On page 13, in Column 1, item (56) under "Other Publications", Lines 19-20, delete "18, 2018 t"," and insert --18, 2018",-- therefor On page 14, in Column 1, item (56) under "Other Publications", Line 28, delete "18791363.7,Response" and insert --18791363.7, Response-- therefor On page 16, in Column 2, item (56) under "Other Publications", Line 66, delete "Ation" and insert --Action-- therefor On page 16, in Column 2, item (56) under "Other Publications", Line 68, delete "Allowane" and insert --Allowance-- therefor On page 18, in Column 1, item (56) under "Other Publications", Line 34, delete "Graphic" and insert --Graphical-- therefor In the Claims In Column 22, Line 29, in Claim 14, delete "Non-transitory" and insert --The non-transitory-- therefor Signed and Sealed this
Seventh Day of October, 2025

John A. Squires
*Director of the United States Patent and Trademark Office*